(12) United States Patent
Marandi et al.

(10) Patent No.: US 11,467,470 B2
(45) Date of Patent: Oct. 11, 2022

(54) WAVELENGTH-SCALE OPTICAL PARAMETRIC OSCILLATORS

(71) Applicant: California Institute of Technology, Pasadena, CA (US)

(72) Inventors: Alireza Marandi, Pasadena, CA (US); Saman Jahani, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 17/093,021

(22) Filed: Nov. 9, 2020

(65) Prior Publication Data
US 2021/0141285 A1    May 13, 2021

Related U.S. Application Data

(60) Provisional application No. 62/932,647, filed on Nov. 8, 2019.

(51) Int. Cl.
  *G02F 1/39* (2006.01)
  *G02F 1/35* (2006.01)

(52) U.S. Cl.
  CPC .............. *G02F 1/39* (2013.01); *G02F 1/3501* (2013.01); *G02F 1/3507* (2021.01)

(58) Field of Classification Search
  CPC ......... G02F 1/3501; G02F 1/3507; G02F 1/39
  See application file for complete search history.

(56) References Cited

U.S. PATENT DOCUMENTS

| | | | | |
|---|---|---|---|---|
| 5,574,818 A | * | 11/1996 | Krivoshlykov | G02F 1/395 385/122 |
| 7,480,425 B2 | * | 1/2009 | Gunn | G02B 6/12007 385/14 |
| 9,293,887 B2 | * | 3/2016 | Li | H01S 3/0632 |
| 2010/0303123 A1 | * | 12/2010 | Li | H01J 3/14 372/98 |
| 2012/0294319 A1 | * | 11/2012 | Maleki | G02F 1/39 372/18 |
| 2012/0327497 A1 | | 12/2012 | Matsko et al. | |
| 2016/0162798 A1 | | 6/2016 | Marandi et al. | |
| 2016/0306258 A1 | * | 10/2016 | Mazur | G02F 1/3526 |
| 2018/0048110 A1 | | 2/2018 | Jestin et al. | |
| 2019/0336213 A1 | | 11/2019 | Rao | |
| 2020/0285131 A1 | * | 9/2020 | Marandi | G02F 1/39 |

(Continued)

FOREIGN PATENT DOCUMENTS

KR    10-2019-0107168    9/2019

OTHER PUBLICATIONS

Roslund, J., et al., "Wavelength-multiplexed quantum networks with ultrafast frequency combs", Nature Photonics, Feb. 2014, pp. 109-112, vol. 8.

(Continued)

*Primary Examiner* — Daniel Petkovsek
(74) *Attorney, Agent, or Firm* — Gates & Cooper LLP

(57) ABSTRACT

An OPO including a resonator comprising a material having a nonlinear susceptibility generating an output electromagnetic field in response to a pump electromagnetic field inputted into the material. The output electromagnetic field has one or more output wavelengths longer than one or more pump wavelengths of the pump electromagnetic field. The resonator has dimensions less than, or on the order of, the one or more output wavelengths in free space.

21 Claims, 16 Drawing Sheets

(56) References Cited

U.S. PATENT DOCUMENTS

Figures 2A, 2B, 2C:
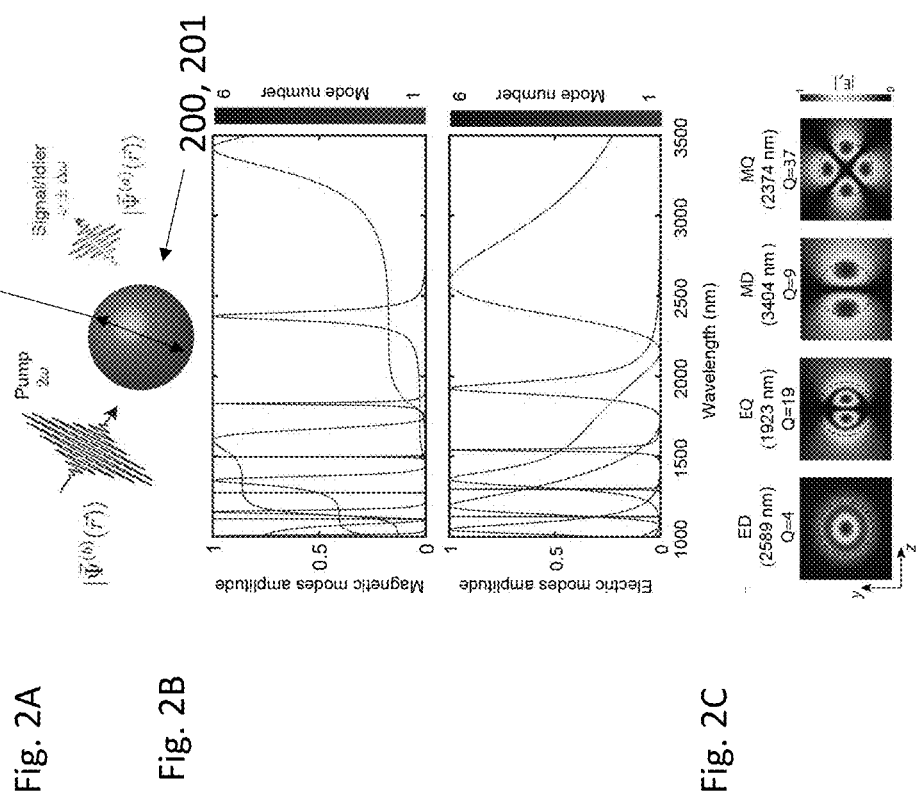

2021/0080805 A1* 3/2021 Srinivasan ............ G02F 1/3501
2021/0096444 A1* 4/2021 Zhang ................... G02F 1/3536

OTHER PUBLICATIONS

Roy, A., et al., "Non-Dissipative Non-Hermitian Dynamics and Exceptional Points in Coupled Optical Parametric Oscillators", Optica, 2020, pp. 415-421, vol. 8, No. 3, arXiv:2009.07522.
Roy, A., et al., "Spectral Phase Transitions in Optical Parametric Oscillators", Nature Communications, 2020, pp. 1-7, vol. 12, No. 835, arXiv:2009.00930.
Sauvan, C., et al., "Theory of the Spontaneous Optical Emission of Nanosize Photonic and Plasmon Resonators", Physical Review Letters, Jun. 2013, pp. 237401-1-237401-5, vol. 113.
Schliesser, A., et al., "Mid-infrared frequency combs", Nature Photonics, 2012, pp. 440-449, vol. 6.
Smirnova, D., et al., "Multipolar nonlinear nanophotonics", Optica, Nov. 2016, pp. 1241-1255, vol. 3, No. 11.
Timofeeva, M., et al., "Anapoles in Free-Standing III-V Nanodisks Enhancing Second-Harmonic Generation", Nano Letters, 2018, pp. 3695-3702, vol. 18.
Wang, C., et al., "Ultrahigh-efficiency wavelength conversion in nanophotonic periodically poled lithium niobate waveguides", Optica, Nov. 2018, pp. 1438-1441, vol. 5, No. 11.
Werner, C.S., et al., "Blue-pumped whispering gallery optical parametric oscillator", Optics Letters, Oct. 2012, pp. 4224-4226, vol. 37, No. 20.
Wu, L-A, et al., "Generation of Squeezed States by Parametric Down Conversion", Physical Review Letters, Nov. 1986, pp. 2520-2523, vol. 57, No. 20.
Yang, L-P, et al., "Single-photon pulse induced giant response in N > 100 qubit system", npj Quantum Information, 2020, pp. 1-6, vol. 6, No. 1.
Yang, Y., et al., "High-harmonic generation from an epsilon-near-zero material", Nature Physics, 2019, pp. 1-15, vol. 15, No. 10.
Yan, W., et al., "Rigorous modal analysis of plasmonic nanoresonators", Phys. Rev. B 97, 205422, May 2018, pp. 1-38.
PCT International Search Report & Written Opinion dated Feb. 25, 2021 for PCT Application No. PCT/US2020/059696.
Alves, G.B., et al., "Conditions for optical parametric oscillation with structured light pump", Physical Review A, 2018, pp. 1-10, vol. 98, No. 6.
Arute, F., et al., "Quantum supremacy using a programmable superconducting processor", Nature, 2019, pp. 505-510, vol. 574, No. 7779.
Baranov, D.G., et al., "All-dielectric nanophotonics: the quest for better materials and fabrication techniques", Optica, Jul. 2017, pp. 814-825. vol. 4, No. 7.
Breunig, I., "Three-wave mixing in whispering gallery resonators", Laser Photonics Rev. 2016, pp. 569-587, vol. 10, No. 4.
Bruch, A.W., et al., "On-chip x(2) microring optical parametric oscillator", Optica, Oct. 2019, pp. 1361-1366, vol. 6, No. 10.
Buckley, S., et al., "Multimode nanobeam cavities for nonlinear optics: high quality resonances separated by an octave", Optics Express, Nov. 2014, pp. 26498-26509, vol. 22, No. 22.
Carletti, L., et al., "Giant nonlinear response at the nanoscale driven by bound states in the continuum", Physical Review Letters 033903, 2018, pp. 1-7, vol. 121, No. 3.
Chen, M., et al., "Experimental realization of multipartite entanglement of 60 modes of a quantum optical frequency comb", Physical Review Letters 120505, 2014, pp. 1-19, vol. 112, No. 12.
Ciattoni, A., et al., "Phase-matching-free parametric oscillators based on two-dimensional semiconductors", Light Science & Applications, 2018, pp. 1-9, vol. 7, No. 5.
Conti, C., et al., "Optical parametric oscillations in isotropic photonic crystals", Optics Express, Mar. 2004, pp. 823-828, vol. 12, No. 5.
De Valcarcel, G.J., et al., "Squeezing frequency combs", Physical Review A 061801, pp. 1-5, 2006, vol. 74, No. 6.
Eckardt, R.C., et al., "Optical parametric oscillator frequency tuning and control", J. Opt. Soc. Am. B, Mar. 1991, pp. 646-667, vol. 8, No. 3.
Fabre, C., et al., "Squeezing in detuned degenerate optical parametric oscillators", Quantum Optics: Journal of the European Optical Society Part B, 1990, pp. 159-187, vol. 2, No. 2.
Gigli, C., et al., "Quasinormal-mode modeling and design in nonlinear nano-optics", ACS Photonics, 2020, pp. 1-8.
Gili, V.F., et al., "Monolithic AlGaAs second-harmonic nanoantennas", Optics Express, Jul. 2016, p. 15965-15971, vol. 24, No. 14.
Hadfield, R.H., "Single-photon detectors for optical quantum information applications", Nature Photonics, Dec. 2009, pp. 696-705, vol. 3, No. 12.
Hamerly, R., et al., "Reduced models and design principles for half-harmonic generation in synchronously-pumped optical parametric oscillators", Physical Review A, 063809, 2016, pp. 1-22, vol. 94, No. 6.
Herr, T., et al., "Temporal solitons in optical microresonators", Nature Photonics, Feb. 2014, pp. 145-152, vol. 8, No. 2.
Inagaki, T., et al., "Large-scale Ising spin network based on degenerate optical parametric oscillators", Nature Photonics, 2016, pp. 1-6, vol. 10, No. 415.
Jahani, S., et al., "Transparent subdiffraction optics: nanoscale light confinement without metal", Optica, Aug. 2014, pp. 96-100, vol. 1, No. 2.
Jahani, S., et al., "All-dielectric metamaterials", Nature Nanotechnology, Jan. 2016, pp. 23-36, vol. 11.
Jahani, S., et al., "Controlling evanescent waves using silicon photonic all-dielectric metamaterials for dense integration", Nature Communications, 2018, pp. 1-10, vol. 9, No. 1893.
Kippenberg, T.J., et al., "Kerr-Nonlinearity Optical Parametric Oscillation in an Ultrahigh-Q Toroid Microcavity", Physical Review Letters, Aug. 2004, pp. 083904-1-083904-4, vol. 93, No. 8.
Koshelev, K., et al., "Subwavelength dielectric resonators for nonlinear nanophotonics", Science, Jan. 2020, pp. 288-292, vol. 367.
Krasnok, A., et al., "Nonlinear metasurfaces: a paradigm shift in nonlinear optics", Materials Today, Jan./Feb. 2018, pp. 8-21, vol. 21, No. 1.
Kuznetsov, A.I., et al., "Optically resonant dielectric nanostructures", Science, Nov. 2016, pp. aag2472-1-aag2472-8, vol. 354, No. 6314.
Lalanne, P., et al., "Light Interaction with Photonic and Plasmonic Resonances", Laser Photonics Rev., 2018, pp. 1-38, vol. 12, No. 5.
Lin, Z., et al., "Cavity-enhanced second-harmonic generation via nonlinear-overlap optimization", Optica, Mar. 2016, pp. 233-238, vol. 3, No. 3.
Liu, S., "Resonantly Enhanced Second-Harmonic Generation Using III-V Semiconductor All-Dielectric Metasurfaces", Nano Letters, 2016, pp. 5426-5432, vol. 16.
Lukin, D.M., et al., "4H-silicon-carbide-on-insulatorfor integrated quantum and nonlinear photonics", Nature Photonics, May 2020, pp. 330-334, vol. 14.
Marandi, A., et al., "Coherence properties of a broadband femtosecond mid-IR optical parametric oscillator operating at degeneracy", Optics Express, Mar. 2012, pp. 7255-7262, vol. 20, No. 7.
Marandi, A., et al., "Network of Time-Multiplexed Optical Parametric Oscillators as a Coherent Ising Machine", Nature Photonics, 2014, pp. 1-22, vol. 8, No. 12.
Marino, G., et al., "Spontaneous photon-pair generation from a dielectric nanoantenna", Optica, Nov. 2019, pp. 1416-1422, vol. 6, No. 11.
McMahon, P.L., et al., "A fully programmable 100-spin coherent Ising machine with all-to-all connections", Science, Nov. 2016, pp. 614-617, vol. 354, Issue No. 6312.
Milburn, G., et al., "Production of Squeezed States in a Degenerate Parametric Amplifier", Dptics Communications, Nov. 1981, pp. 401-404, vol. 39, No. 6.
Minkov, M., et al., "Doubly resonant x(2) nonlinear photonic crystal cavity based on a bound state in the continuum", Optica, Aug. 2019, pp. 1039-1045, vol. 6, No. 8.
Miri, M-A, et al., "Exceptional points in optics and photonics", Science, Jan. 2019, pp. 1-11, vol. 363, No. 42.

(56) References Cited

OTHER PUBLICATIONS

Molesky, S., et al., "Inverse design in nanophotonics", Nature Photonics, Nov. 2018, pp. 659-670, vol. 12.

Monticone, F., et al., "Embedded Photonic Eigenvalues in 3D Nanostructures", Physical Review Letters, May 2014, pp. 213903-1-213903-5, vol. 112.

Morin, O., et al., "Remote creation of hybrid entanglement between particle-like and wave-like optical qubits", Nature Photonics, 2014, pp. 570-574, vol. 8.

Muljarov, E.A., et al., "Exact mode volume and Purcell factor of open optical systems", Physical Review B, 2016, pp. 235438-1-235438-19, vol. 94.

Muraviev, A.V., et al., "Massively parallel sensing of trace molecules and their isotopologues with broadband subharmonic mid-infrared frequency combs", Nature Photonics, Apr. 2018, pp. 209-214, vol. 12.

Nehra, R., et al., "State-independent quantum state tomography by photon-number resolving measurements", Optica, Oct. 2019, pp. 1356-1360, vol. 6, No. 10.

Nielsen, M.P., et al., "Giant nonlinear response at a plasmonic nanofocus drives efficient four-wave mixing", Science, 2017, pp. 1179-1181, vol. 358.

Okawachi, Y., et al., "Dual-pumped degenerate Kerr oscillator in a silicon nitride microresonator", Optics letters, 2015, pp. 5267-5270, vol. 40, No. 22.

Pertsch, T., et al., "Nonlinear optics with resonant metasurfaces", Materials Research Society Bulletin, Mar. 2020, pp. 210-220, vol. 45.

Poddubny, A.N., et al., "Nonlinear generation of quantum-entangled photons from high-Q states in dielectric nanoparticles". Physics, arXiv:1808.04811, 2018, pp. 1-6.

Raman, A., et al., "Photonic Band Structure of Dispersive Metamaterials Formulated as a Hermitian Eigenvalue Problem", Physical Review Letters, Feb. 2010, pp. 087401-1-087401-4, vol. 104.

Reshef, O., et al., "Nonlinear optical effects in epsilon-near-zero media", Nature Reviews | Materials, Aug. 2019, pp. 535-551, vol. 4.

Rodriguez, A., et al., "x(2) and x (3) harmonic generation at a critical power in inhomogeneous doubly resonant cavities", Optics Express, Jun. 2007, pp. 7303-7318, vol. 15, No. 12.

\* cited by examiner

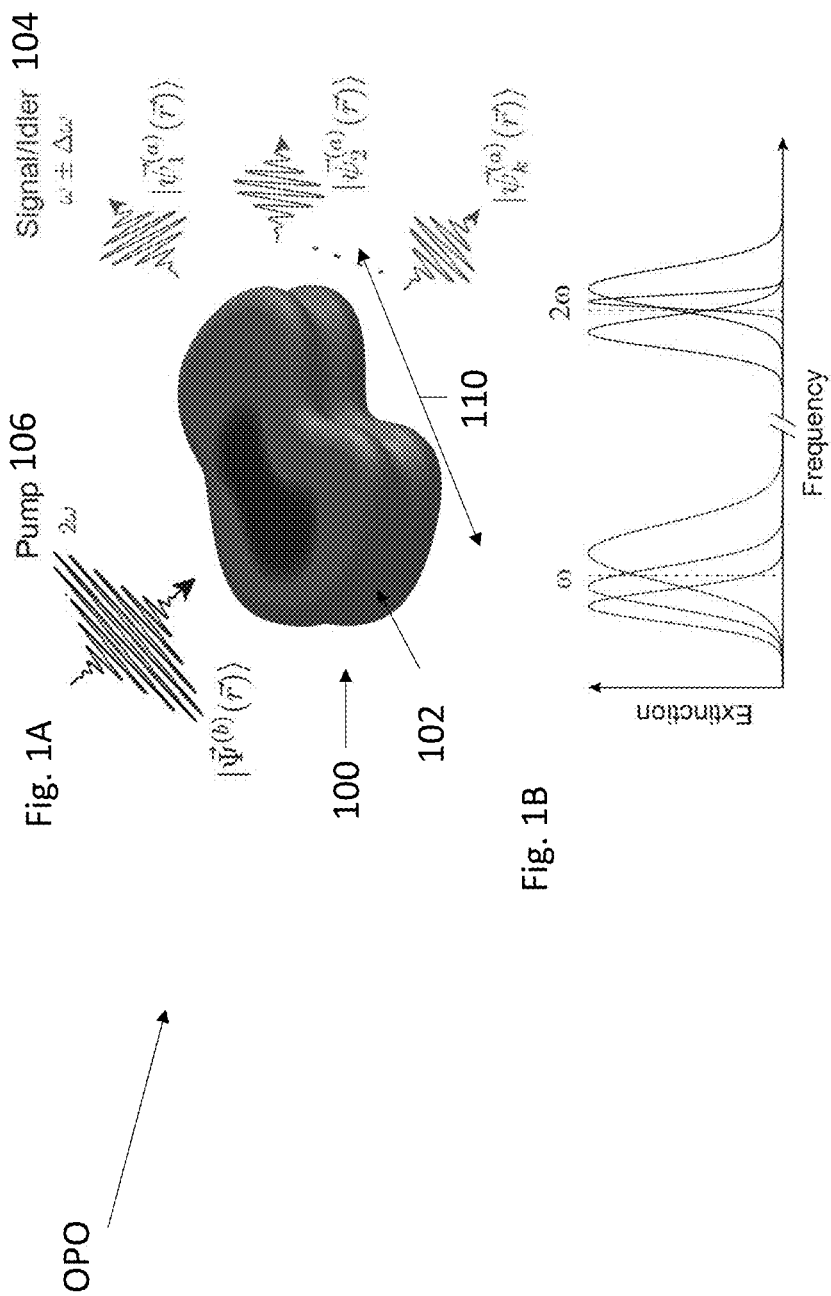

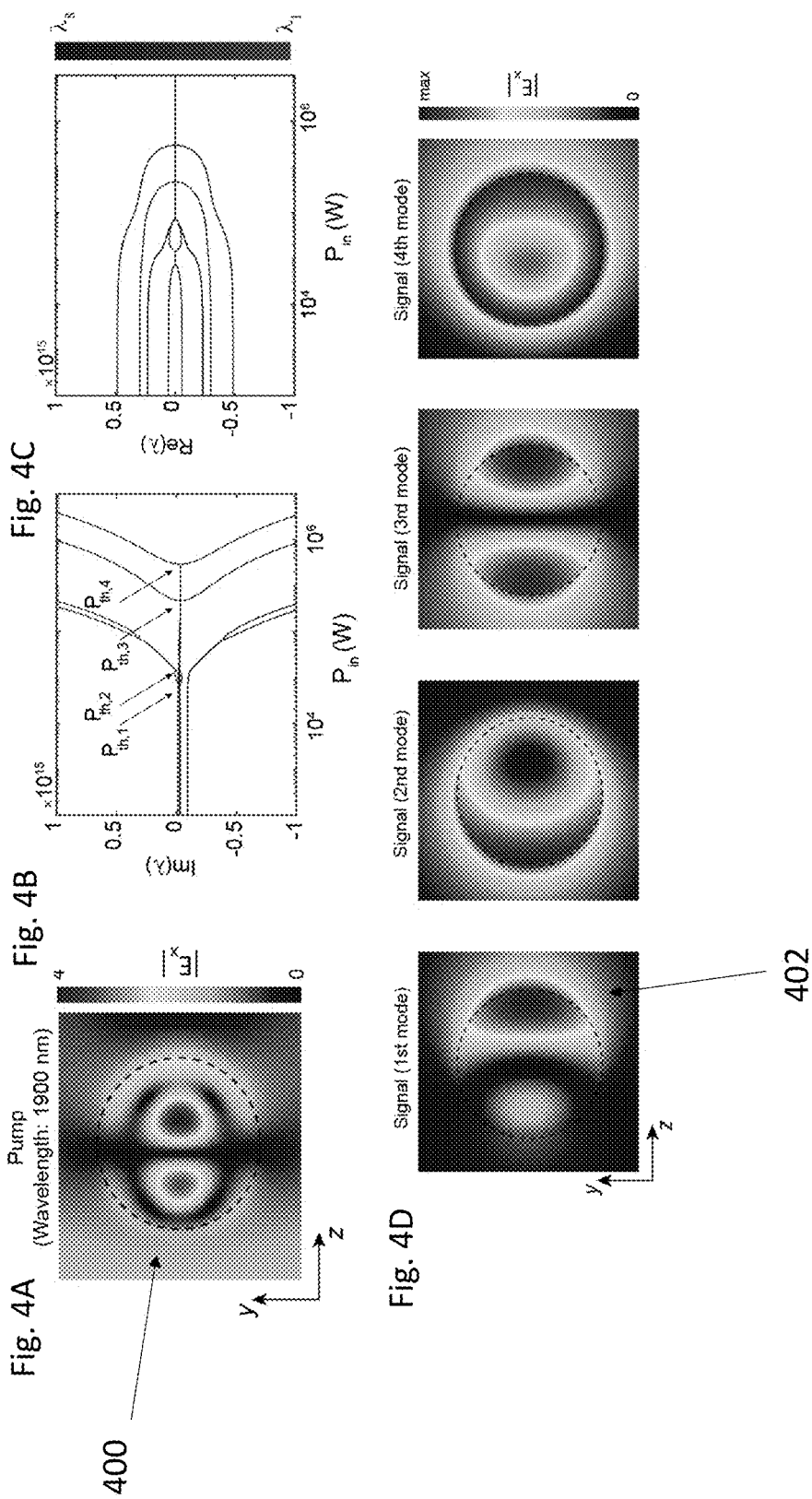

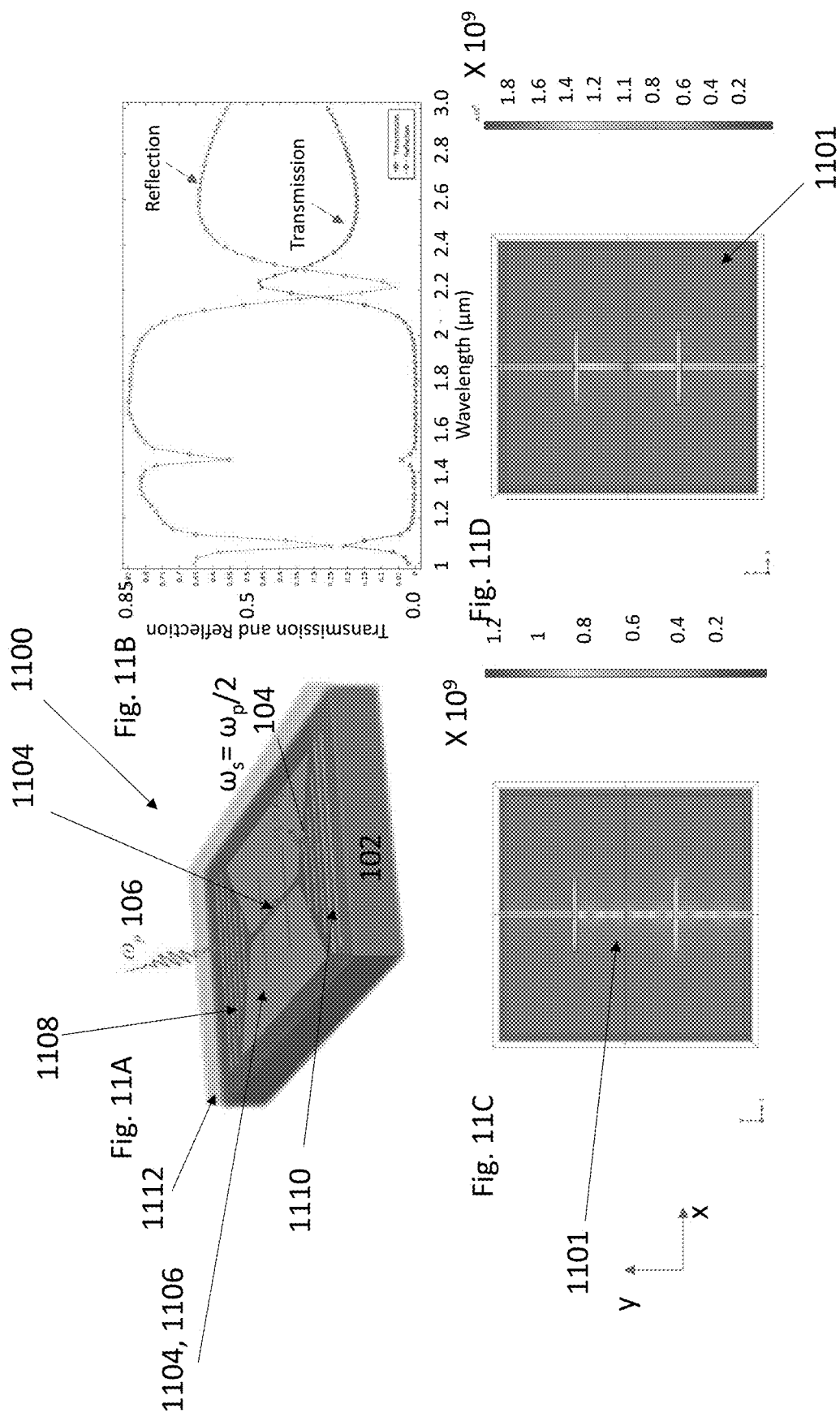

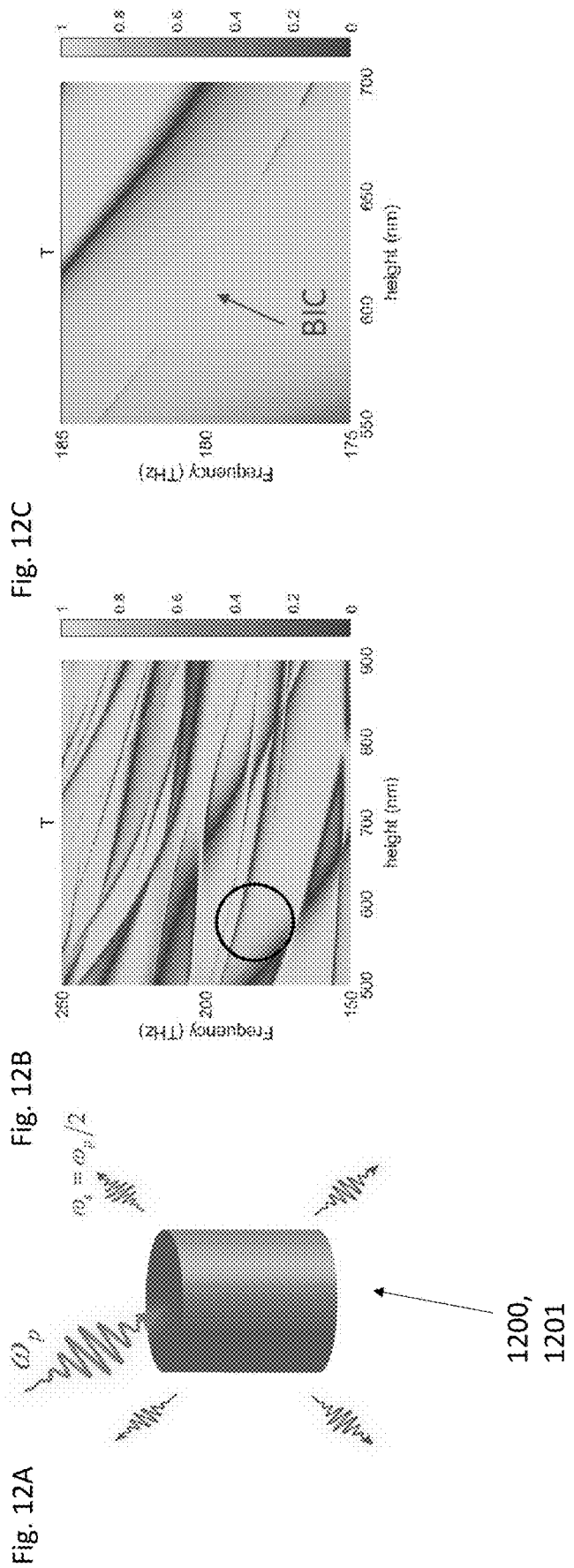

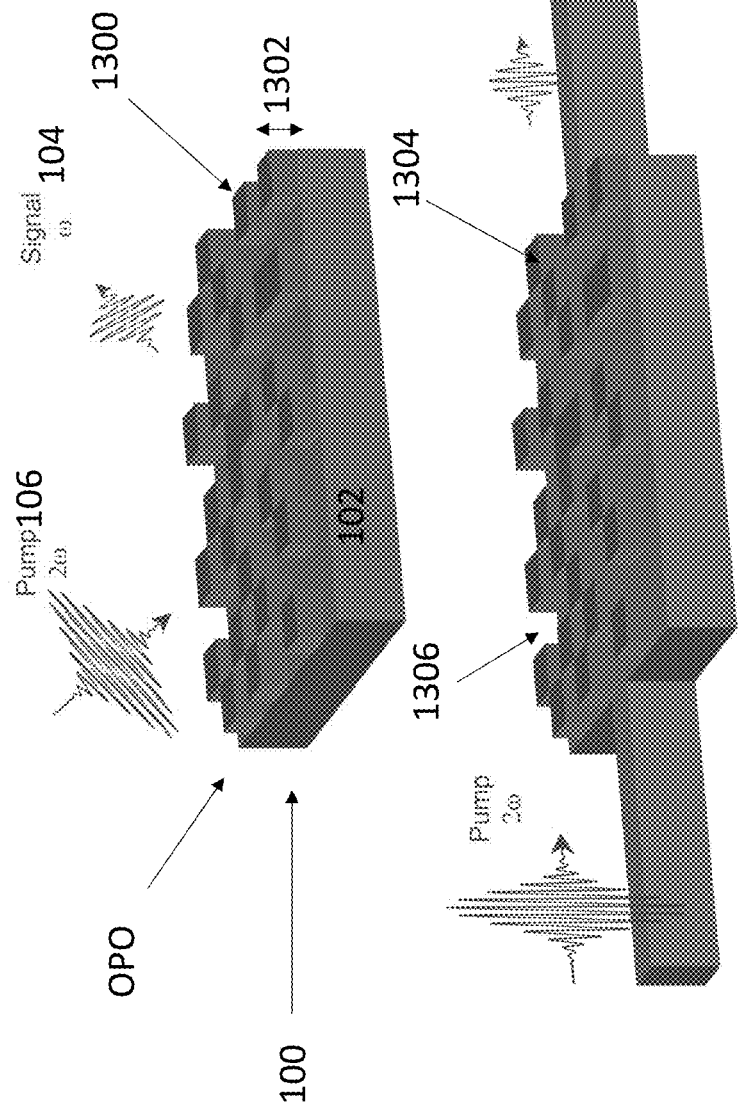

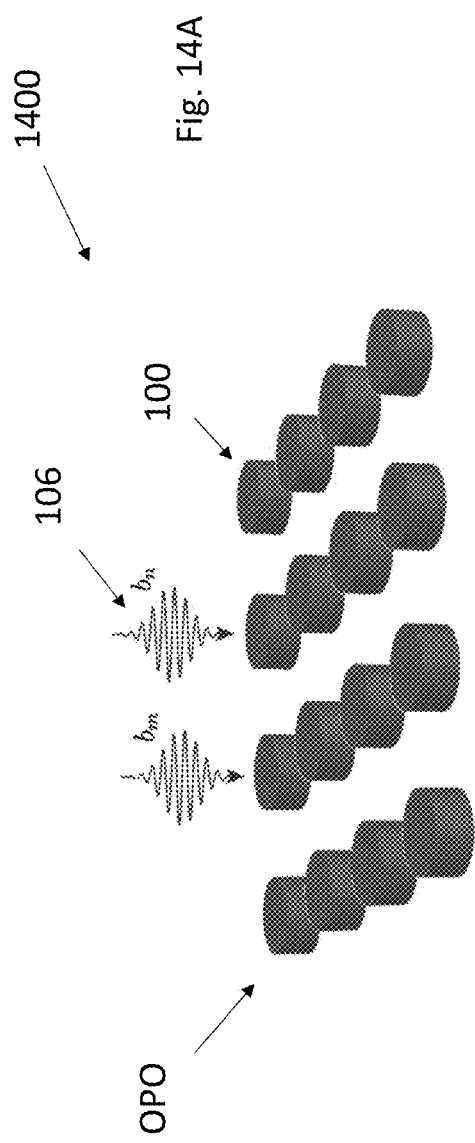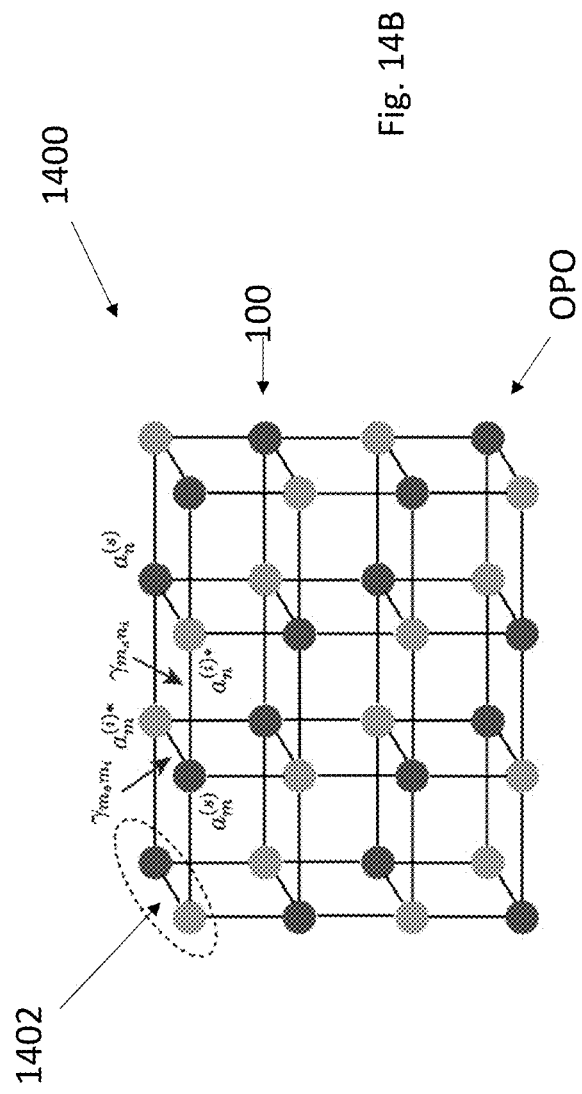

WAVELENGTH-SCALE OPTICAL PARAMETRIC OSCILLATORS

CROSS REFERENCE TO RELATED APPLICATIONS

This application claims the benefit under 35 U.S.C. Section 119(e) of co-pending and commonly-assigned U.S. provisional patent application Ser. No. 62/932,647, filed on Nov. 8, 2019, by Saman Jahani and Alireza Marandi, entitled "WAVELENGTH SCALE OPTICAL PARAMETRIC OSCILLATORS," Client reference CIT-8388-P, which application is incorporated by reference herein.

STATEMENT REGARDING FEDERALLY SPONSORED RESEARCH AND DEVELOPMENT

This invention was made with government support under Grant No, W911NF-18-1-0285 awarded by the Army. The government has certain rights in the invention.

BACKGROUND OF THE INVENTION

1. Field of the Invention

This invention relates to Optical Parametric Oscillators (OPOs) and methods of making the same.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.)

Optical parametric oscillators (OPOs) have been widely used for may applications ranging from metrology and spectroscopy to quantum information science [12, 56, 4, 32, 24, 46, 20, 43, 52]. OPOs consist of a medium with quadratic or Kerr nonlinearity within a resonator, which is typically much larger than the operation wavelength, converting pump photons to signal and idler photons [56, 32, 24, 46, 20, 4]. At degeneracy, the indistinguishable signal and idler of an OPO can form a squeezed vacuum state below the oscillation threshold [36, 61] that have been used for several applications in quantum information processing [52, 8, 41, 44]. Above threshold, the conversion efficiency boosts rapidly and the output signal illustrates a binary phase state which can be utilized as a spin in an artificial Ising network [33, 35]. Above-threshold degenerate OPOs have also been effectively used for generation of mid-IR frequency combs [32, 43].

Recent progress in nanoscale light confinement as well as precise nanofabrication of challenging nonlinear materials [59, 31] have inspired the idea of rethinking the possibilities of miniaturization of nonlinear systems to their extreme. Miniaturized OPOs have recently been demonstrated in on-chip OPOs based on Kerr [46, 24, 10] and quadratic [5] nonlinearities as well as whispering-gallery resonators [60]. The size of these resonators are still orders of magnitude larger than their operating wavelengths. Strong field confinement inside nanostructures has shed light on the possibility of nonlinear optics at nano-scale [57, 21, 40, 45, 50, 63]. However, the main focus so far has been devoted to up-conversion in nanostructures, while optical parametric oscillation in wavelength-scale structures is still unexplored. The conventional theories which have mostly been developed for travelling wave nonlinear optical systems [17] or high-Q resonators [19, 11] cannot be directly applied to accurately model OPOs in nano-structures. The reason is that the spatial variation of the field happens in subwavelength regime where slowly-varying envelope approximation (SVEA) is not valid anymore [17]. Moreover, unlike the conventional large-scale OPOs, in nano-structured resonators, the input pump can excite several modes of the cavity at the pump wavelength, and due the low-Q nature of modes, the pump can also directly interact with several modes at the signal wavelength. Few theoretical models have been proposed recently to explain the spontaneous down-conversion in Mie resonators [48] and the threshold in 2D materials-based OPOs [9]. However, these theories are either limited to specific structures or cannot explain the behavior of the system above the threshold. Moreover, conventional designs and theories do not describe how to achieve optical parametric oscillation in wavelength scale resonators. The present disclosure satisfies this need.

SUMMARY OF THE INVENTION

The present disclosure discloses, predicts the behavior of, and estimates the oscillation threshold of, subwavelength and wavelength-scale optical parametric oscillators (OPOs). We also establish an explicit connection between the second-harmonic generation efficiency and the OPO threshold. This allows us to estimate the OPO threshold based on measured or simulated second-harmonic generation in different class of resonators, such as bound-state in the continuum and inversely designed resonators. Our approach for analyzing and modeling miniaturized OPOs can open unprecedented opportunities for classical and quantum nonlinear photonics.

The devices disclosed herein can be embodied in many ways including, but not limited to, the following.

1. A device including one or more optical parametric oscillators (OPOs), each of the OPOs comprising:

a resonator comprising a material having a nonlinear susceptibility generating an output electromagnetic field in response to a pump electromagnetic field inputted into the material, wherein:

the output electromagnetic field has one or more output wavelengths longer than one or more pump wavelengths of the pump electromagnetic field, and the resonator has dimensions less than, or on the order of, the one or more output wavelengths in free space.

2. The device of example 1, wherein the resonator comprises a particle having the dimensions.

3. The device of example 1 or 2, wherein the resonator supports one or more plasmonic modes of at least one of the pump electromagnetic field or the output electromagnetic field. In one or more examples, the resonator supports plasmons confining the pump and/or the output in resonator.

4. The device of any of the examples 1 or 3, wherein the resonator comprises a structure including a gap that supports a plasmonic mode that overlaps with the material.

5. The device of example 4, further comprising an additional material having a second order nonlinear susceptibility on top of the gap.

6. The device of any of the examples 1-5, wherein the resonator includes an additional material having different optical properties (e.g., dielectric constant) than the material and the resonator has a structure tailored and accounting for a first interaction of the pump electromagnetic field and a second interaction of the output electromagnetic field with the additional material and the material, so as to increase an efficiency of a parametric interaction of the pump electromagnetic field and the output electromagnetic field as compared to without the additional material.

7. The device of any of the examples 1-6, wherein the resonator includes an additional material comprising or consisting essentially of at least one of a polymer, a glass, a linear material, or an index of refraction less than 2. In example, a linear material is defined as not having a second order susceptibility. In another example, the linear material is defined as a material that is not "non-linear."

8. The device of any of the examples 5-7, wherein the additional material comprises a polymer.

9. The device of any of the examples 1-8, wherein the resonator includes a plurality of regions or pixels including different dielectric constants and thicknesses arranged to optimize or tailor an overlap of the pump electromagnetic field and the output electromagnetic field and/or reduce oscillation threshold for the OPO.

10. The device of any of the examples 1-9, wherein a largest of the dimensions is less than 10 microns or the resonator fits within a sphere having a radius of 5 microns.

11. The device of any of the examples 1-10, wherein resonator supports one or more quasi normal electromagnetic modes of the pump electromagnetic field and/or quasi normal electromagnetic modes of the output electromagnetic field.

12. The device of example 11, wherein the quasi normal electromagnetic modes comprise one or more multi polar Mie resonances comprising the output electromagnetic field.

13. The device of example 12 based on Mie-type multipolar resonances, wherein, due to the low-Q nature of multipolar modes in wavelength-scale resonators, there is a nonlinear interaction between these modes. As a result, the OPO threshold, compared to the single-mode case, can be reduced by a factor which is significantly larger than the number of interacting modes.

14. The device of any of the examples having a multi-mode interaction leading to a phase transition manifested through a sudden change in the parametric gain as well as the oscillation threshold.

15. The device of any of the examples 1-14, further comprising a disk, cylinder, or a sphere including the resonator.

16. The device of any of the examples 1-15, wherein the resonator has an polygonal cross section or an arbitrary cross section (e.g., circular or irregular cross-section).

17. The device of any of the examples 1-16, wherein the resonator is lithographically, patterned.

16. The device of any of the examples 1-17, wherein the material comprises at least one of a metal, a dielectric, a semiconductor, or a polymer.

19. The device of any of the examples 1-18, wherein the material has at least one of a second order susceptibility or third order susceptibility.

20. The device of any of the examples 1-19, comprising a plurality of the OPOs wherein the resonators are evanescently coupled or coupled through waveguides or auxiliary cavities.

21. The device of any of the examples 1-20, comprising a plurality of the OPOs outputting a plurality of output electromagnetic fields in response to a plurality of the pump electromagnetic fields, each of the pump electromagnetic fields having at least one of a phase or an amplitude that is different from the phase or the amplitude of another of the pump electromagnetic fields.

23. A sensor comprising a network including a plurality of the OPOs of any of the examples 1-19 and one or more detectors coupled to detect the output electromagnetic field, thereby sensing the pump electromagnetic field or an environment around the network via a detection of the output electromagnetic field by the detector.

23. An optical computer, comprising:
a network including a plurality of the OPOs of claim 1; and
couplings between the OPOs, wherein the couplings are adjusted to model an array of coupled spins, so that a minimum threshold of each of the OPOs corresponds to a minimum energy configuration of one of the coupled spins in the array.

24. The device of any of the examples 1-23 having a multi-mode interaction leading to a phase transition manifested through a sudden change in the parametric gain as well as the oscillation threshold that can be utilized in enhanced sensing.

The present disclosure further discloses a method of operating an OPO according to one or more of the examples 1-21, comprising inputting a pump electromagnetic field into the resonator and configuring the OPO for at least one of the following:

the OPO operating at degeneracy and at least one of the output wavelengths is twice at least one of the pump wavelengths, the output electromagnetic field comprising a frequency comb comprising a set of equidistant frequency peaks, the output electromagnetic field having an output spectrum broader than an input spectrum of the pump electromagnetic field, in frequency units measured at the 30-dB level below the peak, or the pump electromagnetic field comprises a continuous wave, a time varying, or a pulsed electromagnetic field.

BRIEF DESCRIPTION OF TRE DRAWINGS

Referring now to the drawings in which like reference numbers represent corresponding parts throughout:

FIGS. 1A-M: Wavelength-scale optical parametric oscillators (OPOs). FIG. 1A is an OPO with arbitrary geometry which resonates around the pump frequency ($2\omega$) and the half-harmonic ($\omega \pm \Delta\omega$), FIG. 1B illustrates the nonlinear behavior of the OPO can be determined by knowing the spatial overlap between the pump excitation at $2\omega$ and eigenmodes of the cavity around $\omega$ as well as the linear properties of the cavity around the pump and signal frequencies.

FIGS. 2A-2C: OPO in a nanoscale dielectric sphere. FIG. 2A illustrates the resonator is composed of a AlGaAs spherical particle with a radius of 500 nm and a pump with a wavelength around the particle size can excite the multipolar modes of the particle. FIG. 2B illustrates normalized scattering amplitude of the electric and magnetic modes. It for a broad portion of the spectrum, the particle supports multiple modes which spatially and spectrally overlap. FIG. 2C illustrates the normalized x component of the electric field for the first two electric and the first two magnetic eigenmodes. If the pump is in the sub-wavelength-regime (pump wavelength is >1500 nm), the OPO signal can be a superposition the lower order modes: electric dipole (ED), electric quadrupole (EQ), magnetic dipole (MD), and magnetic quadrupole (MQ). For the excitations at shorter wavelengths, higher order modes come into play as well.

Figures 3A, 3B:
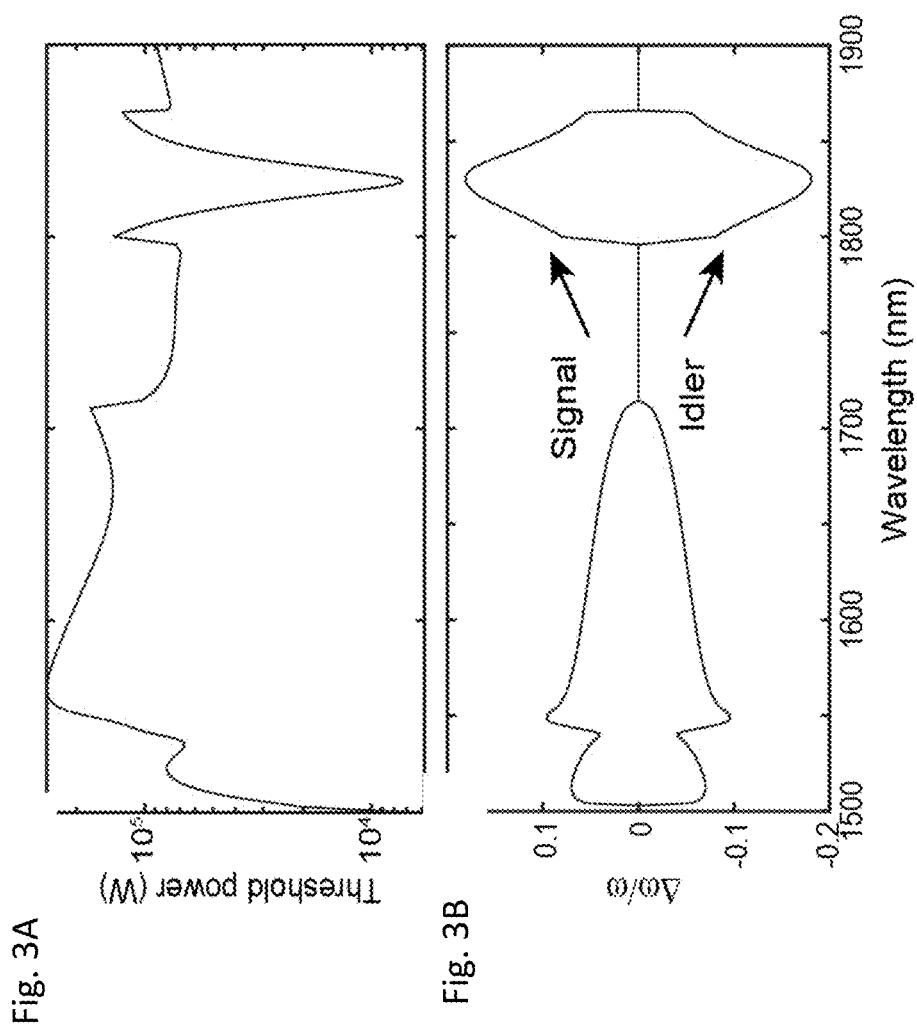

FIGS. 3A-3B: flub-wavelength OPO in a dielectric sphere. The structure is the same as that shown in FIG. 2A. FIG. 3A shows the oscillation threshold as a function of the pump wavelength. The input is a plane wave which excites multiple modes of the resonator at the pump wavelength. FIG. 3B shows the signal and idler frequency separation ($\pm\Delta\omega$) from the half-harmonic frequency ($\omega$) at the threshold as a function of the pump wavelength. The nonlinear interaction between the modes can reduce the threshold significantly. It can also cause a phase transition from degenerate ($\Delta\omega=0$) to non-degenerate ($\Delta\omega\neq0$) which results in a sudden change in the oscillation threshold.

FIGS. 4A-4D: Modes and eigenvalues in a sub-wavelength OPO in a dielectric sphere. FIG. 4A shows the electric field profile at pump wavelength (1900 nm) normalized to the amplitude of the plane-wave excitation. FIGS. 4B-4C show the imaginary (FIG. 4B) and the real (FIG. 4C) part of the eigenvalues as a function of the pump power. The eigenvalues are sorted based on their real part values. The imaginary part and the real parts correspond to the parametric gain and detuning from the half-harmonic respectively. When the real part of the eigenvalues becomes positive, the parametric gain overcomes the loss. Hence, the down-converted signal can surpass the oscillation threshold. FIG. 4D shows the electric field profile of the signal supermodes. It is seen that even though the detuning for MQ mode at half-harmonic is significantly larger compared to ED and MD modes, the contribution of MQ mode on the first signal supermode is more evident. This is due to the stronger overlap between the pump mode and the MQ mode. The strong nonlinear coupling between the signal eigenmodes helps to reduce the threshold 50 times compared to the case where we consider only one of the modes for the signal.

Figure 5:
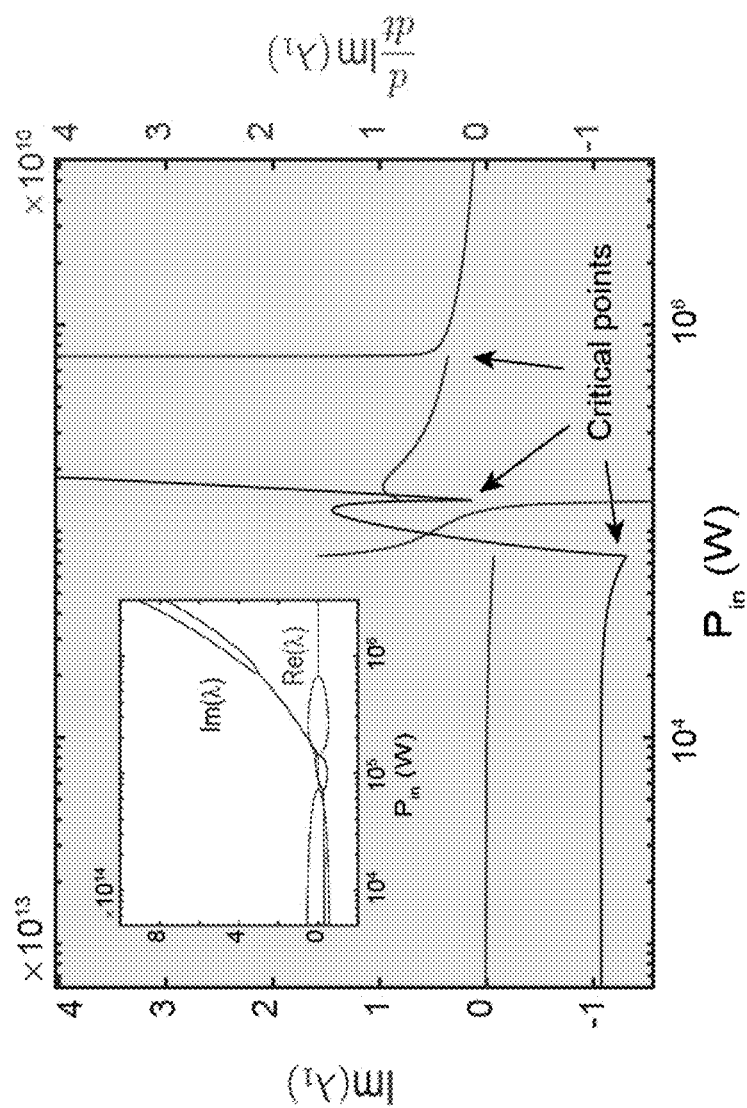

FIG. 5: Phase transition in wavelength-scale OPOs. The imaginary part of the largest eigenvalue (blue) and its derivative for the structure shown in FIGS. 4A-4D. The inset shows both the real and imaginary parts of the two eigenvalues with the smallest real part, which correspond to $\lambda_1$ and $\lambda_2$ for most of the input powers. When there is a transition from degenerate (shaded as green) to non-degenerate (shaded as red), there is an abrupt change in the parametric gain at the critical points. The discontinuities in the derivative of the parametric gain corresponds to phase transitions in OPO. When two eigenvalues coalesce at a critical point, the derivative of the parametric gain diverges.

FIGS. 6A-6D: Wavelength-scale OPO FIG. 6A shows the OPO threshold as a function of the pump wavelength. The dips in threshold around 1110 nm and 1125 nm correspond to the 6 magnetic mode and the 5 electric mode, respectively. The Q factor for these modes are $10^4$ and 2500, respectively. The first 4 electric modes and 5 magnetic modes are considered as the eigenmodes for signal and idler modes. FIG. 6B shows normalized detuning of the signal and idler from the half-harmonic at the threshold. Spectral phase transition can be observed leading to a sudden change in $\Delta\omega$ and a discontinuity in the derivative of the threshold. FIG. 6C shows the electric field distribution for the pump and the first signal/idler supermodes when the pump is at 1110 nm. FIG. 6D shows the electric field distribution for the pump and the first signal/idler supermodes when the pump is at 11.2:5 nm.

Figure 7:
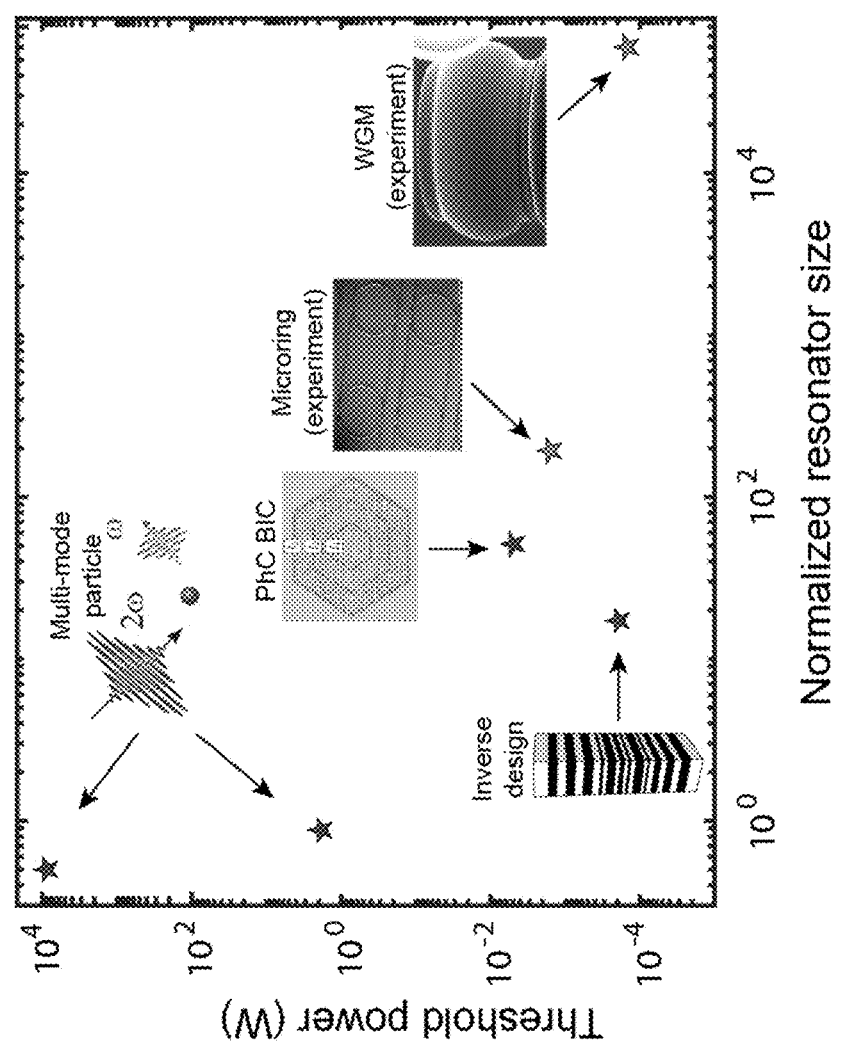

FIG. 7: Estimation of OPO threshold in various platforms. The estimation of the threshold in a single-mode photonic crystal [37] and inversely designed cavities [29] are based on the reported value for the SHG efficiency. The resonator sizes are normalized to the pump wavelength. As a reference, we have included OPOs demonstrated experimentally based on mirroring [5] and whispering-gallery mode (WGM) [60] resonators.

Figures 8A, 8B:
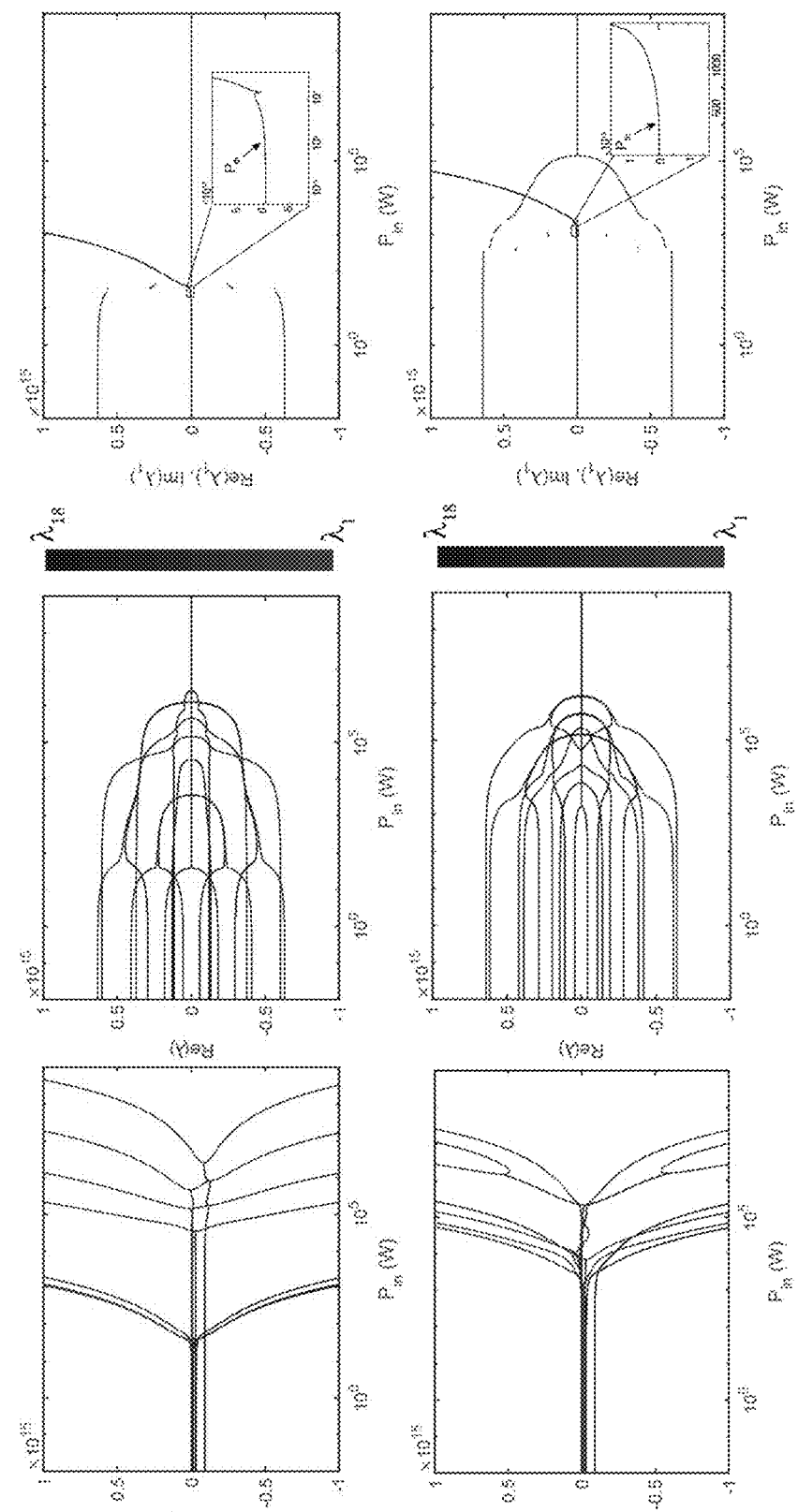

FIGS. 8A-8B: Eigenvalues of the wavelength-scale OPOs. The structure is the same as that FIG. 6. FIG. 8A shows Im as a function of Pin for the pump wavelength at 1110 nm. FIG. 8B shows Im as a function of Pin for the pump wavelength at 1125 nm. The OPO threshold is 2 W and 467 W, respectively. However, the parametric gain is small because of the large signal/idler separation. As soon as the OPO goes through a phase transition into degenerate phase, the parametric gain increases rapidly. The threshold for degenerate OPO is 34 W and 1929 W, respectively.

Figure 9A:
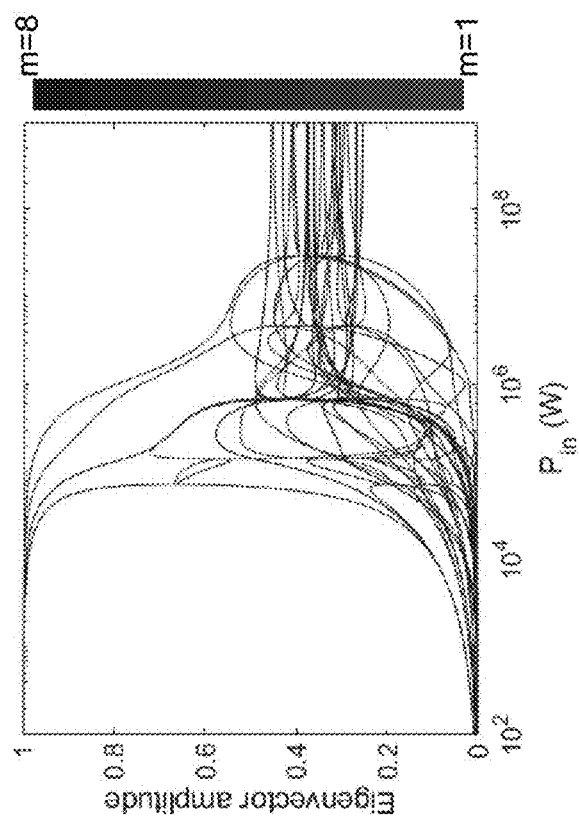
Figure 9B:
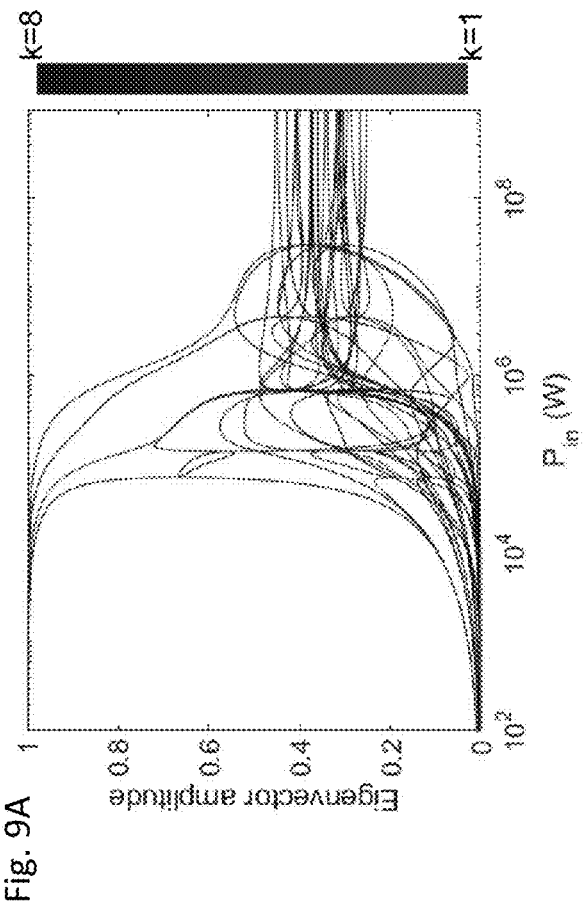

FIGS. 9A-9B: amplitudes, Eigenvector $\alpha_{k,m}^{(a)}$, for all eigenvalues. The structure is the same as that shown in FIGS. 4A-4D. In, FIG. 9A, the color bar represents the mode number. In FIG. 9B, the color bar represents the eigenvalue number. It is seen that at low input power, each supermode corresponds to one eigenmode. However, as we approach the threshold the nonlinear coupling increases the contribution of other eigenmodes for all signal supermode.)

Figures 10A, 10B:
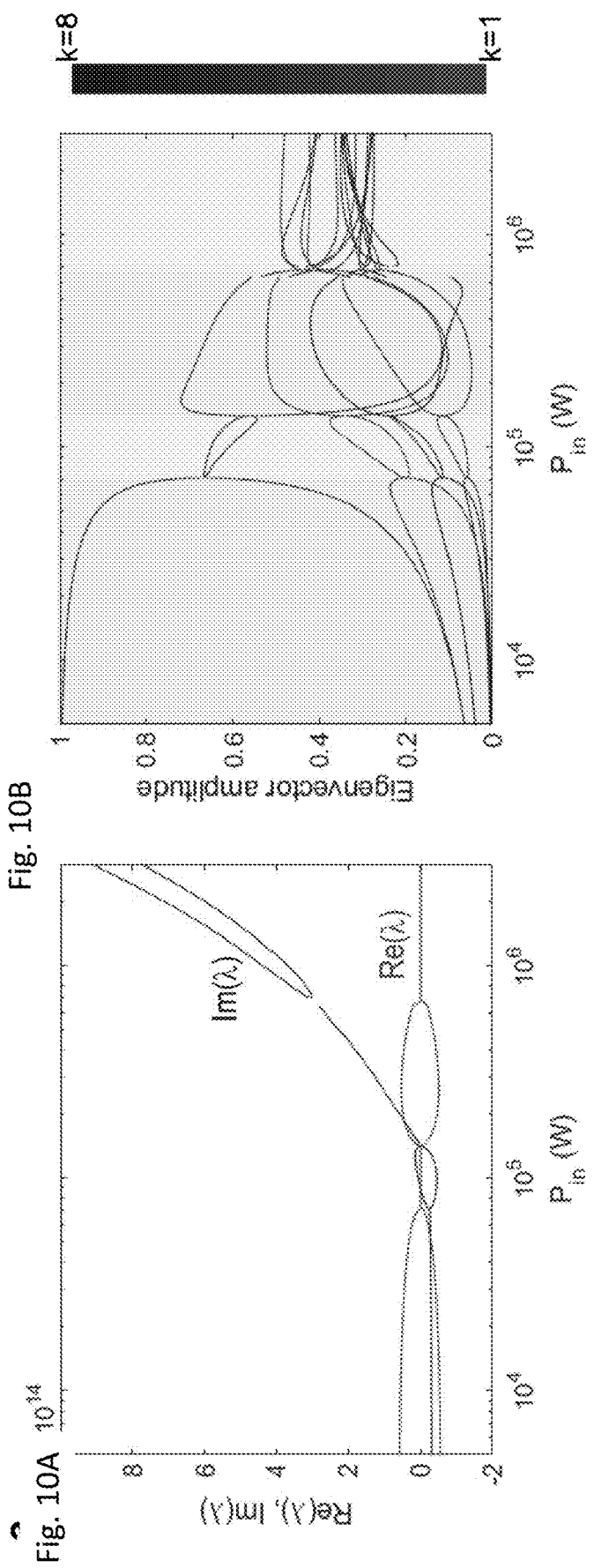

FIGS. 10A-10B: Eigenvector amplitudes, $\alpha_{k,m}^{(a)}$, for all eigenvalues. The structure is the same as that shown in FIGS. 4A-4D. FIG. 10A shows the real parts of the two eigenvalues with the smallest real parts (as well as the largest imaginary parts for most of the input powers) FIG. 10B shows the eigenvectors for the corresponding supermodes. The degenerate and non-degenerate regions are shaded as green and red, respectively. The eigenvalues as well as the eigenvectors of the two modes coalesce when there is a transition from degenerate to non-degenerate cases and vice versa.

FIGS. 11A-11D: Hybrid plasmonic/LiNbO$_3$ wavelength-scale OPO. FIG. 11A shows a schematic representation of a plasmonic resonator on a LiNbO$_3$ substrate. The structure can be covered by a cladding which can be composed of a linear (e.g. SiO$_2$) or a nonlinear (e.g. electro-optic polymers) material. The plasmonic resonator is composed of a thin metal layer (thickness<50 nm). The plasmonic mode can be strongly confined inside the gap (gap size<50 nm) and the LiNbO$_3$ region near the gap. FIG. 11B shows the simulation results for linear transmission through the resonator and the reflection from the input ports as a function of the input wavelength. The ports are set at the beginning of the plasmonic slot waveguides. The length of the resonator in this case is 600 mil. FIGS. 11C, 11D show the electric field profile inside the resonator at the resonances at 1.1 µm (FIG. 11C) and 2.2 µm (FIG. 11D).

FIGS. 12A-12C: Dielectric wavelength-scale OPO. FIG. 12A shows a schematic representation of a dielectric resonator as a wavelength-scale OPO. The structure can be composed of a high-index material with second order nonlinearity (e.g. GaAs, InP, LiNbO$_3$, GaP, AlGaAs, etc.). FIG. 12B shows the transmission spectrum as a function of the height and the frequency for a AlGaAs resonator with a diameter of 500 nm. Multiple resonances are supported by the structure. FIG. 12C shows the transmission around the mode specified by a circle in FIG. 12B. It is seen that the Q factor diverges to infinity for this mode which corresponds to the bound-states in the continuum (BIC) mode of the resonators. The high Q nature of these modes can be implemented to reduce the threshold in this type of wavelength-scale OPOs. Other type of Mie-type resonances such as magnetic modes, anapole and Fano resonances can also be implemented to reduce the OPO threshold in dielectric resonators.

FIGS. 13A-13B: Inverse approach for designing wavelength-scale OPO. FIG. 13A is schematic representation of inversely designed wavelength-scale OPO according to a first example and FIG. 13B is a schematic representation of the inversely designed OPO according to a second example. The resonator structure can be optimized to have the maximum field overlap between the pump and the signal with high quality factors at the signal and the pump wavelengths. To optimize the wavelength-scale OPO, the structure is discretized to small pixels. Each pixel can be either a high index/nonlinear (blue) or a low index (air here) material, Using an optimization algorithm, we can find the best configuration for pixels to have the lowest OPO threshold. The structure can be in/out coupled from the free space or through waveguides.

FIG. 14A. Schematic of a plurality or an array of OPOs.

FIG. 14B. Schematic of a network of coupled OPOs.

Figure 15:
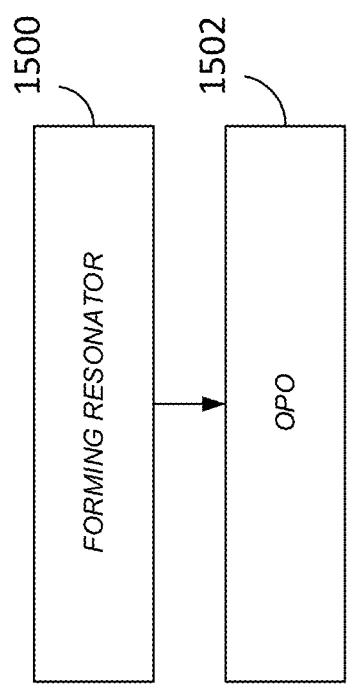

FIG. 15. Method of making an OPO according to one or more examples.

Figure 16:
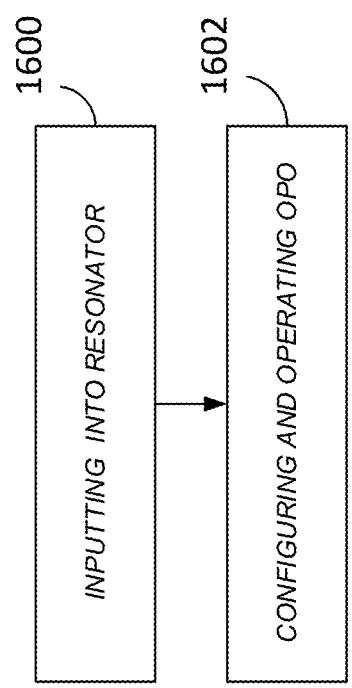

FIG. 16. Method of operating an OPO according to one or more examples.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The present disclosure describes general conditions for parametric oscillation in subwavelength and wavelength-scale resonators. In the low-Q regime of these resonators, multiple modes around the signal wavelength can spectrally and spatially overlap (FIG. 1). This allows them to nonlinearly interact with each other through the pump.

In a first example, we estimate the OPO threshold in an nanostructure (AlGaAs nanoparticle) which supports Mie-type multipolar resonances. We show that the multi-mode interaction at the signal wavelength can lead to a significant reduction in the threshold by a factor which is remarkably higher than the number of modes. The multi-mode interactions also result in a phase transition from degenerate to non-degenerate in these resonators with an abrupt change in the parametric gain and/or oscillation threshold which can be utilized for ultra-sensitive measurements. Moreover, we establish a connection between up-conversion processes in nanostructures and parametric down-conversion. This allows us to define parameter space for OPOs operating sum-frequency/second-harmonic generation. However, the approach described herein is general and can predict optical parametric oscillation in a wide range of resonators, such as bound state in continuum, photonic crystals, inversely designed cavities, plasmonic resonators, and a variety of other nanostructured and microstructured resonators.

1. Example Theory

To estimate the OPO threshold in multi-mode wavelength-scale resonators, we expand the field inside the cavity in terms of orthogonal eigenmodes (FIG. 1A), and we approximate the nonlinear dynamics of the electric field with a slowly varying envelope evolving in time-domain (see section 3 for more details). The electric field for the signal, idler, and pump can be expanded as the superposition of the quasi-normal modes as $$\vec{E}(\vec{r}, t) = \varepsilon_a \sum_k \alpha_k(t) e^{-i\left(\omega - i\frac{\alpha_k}{2}\right)t} |\vec{\psi}_k(\vec{r})\rangle + c.c.,$$

where $\alpha_k$ is the slowly varying envelope [18, 13, 51], $\varepsilon_\alpha$ is the normalization constant such that $|\alpha_k|^2$ is the energy stored in the kth mode of the cavity, and for a homogeneous resonator, it is $\varepsilon_\alpha = \sqrt{2/\varepsilon_0 n(\omega)^2}$, $|\vec{\psi}_k(\vec{r})\rangle$ is the cavity quasi-normal modes normalized such that $\langle \vec{\psi}_m(\vec{r}) \vec{\psi}_k(\vec{r}) \rangle = \delta_{mk}$ ($\delta_{mk}$ is the Kronecker delta), $\omega$ is the angular frequency of the signal ($\omega_s$), idler ($\omega_i$) or pump ($\omega_p$), $\alpha_k = \omega_k/Q_k$ is the decay rate of the cavity mode, $\omega_k$ is the eigenfrequency of the kth mode with a quality factor of $Q_k$, and $\delta\omega_k = \omega - \omega_k$ is the detuning of the center of resonance of kth from the frequency of the electromagnetic field.

The wave equation for each of the signal modes is simplified to (see section 3):

$$\frac{d}{dt}\alpha_l^{(s)} = \left(i\delta\omega_l^{(a)} - \frac{\alpha_l^{(a)}}{2}\right)\alpha_l^{(s)} + ib\sum_k \eta_{lk}\alpha_k^{(i)*}, \quad (1)$$

where $\alpha^{(s)}$, $\alpha^{(i)}$ and b represent signal, idler, and pump envelope, respectively. $i\delta\omega_l^{(a)}$ and $\alpha_l^{(a)}$ are the detuning and the decay rate for the signal idler modes, respectively, and $\eta_{lk}$ is the nonlinear coupling between the lth mode and the kth mode as:

$$\eta_{lk} = \omega\left(\frac{\varepsilon_b \chi^{(2)}}{n(\omega)^2}\vec{\psi}_l^{(a)*}(\vec{r})\Psi^{(b)}(\vec{r})\vec{\psi}_k^{(a)*}(\vec{r})\right). \quad (2)$$

Note that the pump mode, $b(t)|\vec{\Psi}^{(b)}(\vec{r})\rangle$, is a superposition of modes at the pump wavelength which is dictated by the input excitation. However, the signal has to be expanded to the quasi-normal modes (See section 3). Equation 1 combined with a similar equation governing the idler dynamics can be written in a matrix form as:

$$i\frac{d}{dt}\mathcal{A}(t) = \mathcal{H}(b)\mathcal{A}(t) \quad (3)$$

where $\mathcal{A}(t) = [\alpha_1^{(s)}, \alpha_1^{(i)s}, \ldots, \alpha_k^{(s)}, \alpha_k^{(i)s}, \ldots]^T$. The electric field can be expressed as a superposition of the eigenmodes as:

$$\vec{E}_\omega(\vec{r}, t) = e^{-i\omega t}\sum_m \left(e^{-i\lambda_m t}\sum_k \alpha_{k,m}^{(s)}|\vec{\psi}_k^{(a)}(\vec{r})\rangle + e^{+i\lambda_m^* t}\sum_k \alpha_{k,m}^{(i)*}|\vec{\psi}_k^{(a)}(\vec{r})\rangle\right) + c.c., \quad (4)$$

where $[\lambda_m]$ are the eigenvalues and $\vec{V}_m = [\alpha_{k,m}^{(s,i)}]$ are the corresponding eigenvectors of the Hamiltonian ($\mathcal{H}$) which define the signal/idler supermodes. A supermode starts to oscillate when the imaginary part of the corresponding eigenvalue (Im($\lambda_m$)) surpasses zero. The minimum pump power to reach this condition defines the oscillation threshold. The real part of the eigenvalues corresponds to the signal and idler frequency separation from the half-harmonic ($Re(\lambda_m)=\Delta\omega$; $\omega_{s,i}=\omega\pm\Delta\omega$). Hence, the eigenvalues for degenerate OPOs ($\omega_s=\omega_i=\omega_p/2$) are pure imaginary, and they are complex for non-degenerate cases.

2. Example Results

Our model is general and can be applied to a wide range of resonators. First, we apply our model to estimate the threshold in an AlGaAs sphere (FIG. 2A). The reason that we have chosen this simple structure is that the eigenmodes for this structure can be derived analytically and be expressed as multipolar resonances [22, 27]. Since the modes for a wide range of nanostructures, such as cylinders and cubes, can be expressed as multipolar resonances as well, our results can shed some light on the possibility of OPO in similar structures which are more amenable to fabrication on a chip [3, 26, 47, 30, 7, 34, 58, 25, 14]. Besides, AlGaAs is a low-loss high-index ($\varepsilon\approx10$) material at optical frequencies with strong second-order nonlinearity ($\chi_{ijk}^{(2)}=200$ pm/V, $i\neq j\neq k$) [15], and with appropriate orientation [6], it has been recently explored for strong second-harmonic generation at nanoscale [15, 57, 58, 34, 25]. Hence, it is an excellent candidate for demonstration of OPO at wavelength-scale with relatively low threshold. For a general case of dispersive or non-spherical three-dimensional resonators (FIG. 1A), we can use Lorentz reciprocity theory to find the quasi-normal modes of the resonator [55, 49, 28, 64]. The details are reported in section 3.

FIG. 2B illustrates the normalized scattering coefficients for the first 6 electric and magnetic modes of a particle with a radius of 500 nm. If the particle is excited with a plane wave (or a Gaussian beam), several multipolar modes are excited. We first set the pump in the sub-wavelength regime (pump wavelength>1500 nm) where lower order low-Q modes can be excited at the signal and idler frequencies. Then we discuss the behavior of the OPO in wavelength-scale (pump wavelength≈1000 nm) regime where higher order modes can also contribute.

If we operate in the sub-wavelength regime (i.e. the pump wavelength is larger than the particle size), only the first two electric and the first two magnetic modes can oscillate in the down-conversion process. Higher order modes can be neglected because of their large detuning ($\delta\omega_k\gg1$). The electric field profile of these four modes are illustrated in FIG. 2C. The contribution of each mode in the OPO signal/idler supermode is dictated by the field overlap between the pump and the mode as well as the internode nonlinear coupling as expressed in Eq. 2, the Q factor, and the detuning from the half-harmonic frequency. FIGS. 3A-3B display the oscillation threshold as well as the spectral separation of signal and idler as a function of the pump wavelength. The dip in the threshold spectrum around 1830 nm is due to the enhancement of the pump field as a result of the excitation of the 3 magnetic mode. Away from the center of the resonance, the input pump can still excite multiple lower order modes of the resonator.

If we ignore the intermode coupling and we assume that only one of the eigenmodes can oscillate, the OPO threshold would be considerably higher. For instance, if the pump is at the center of the 3 magnetic resonance, the minimum threshold for the single mode OPO is around 0.27 MW which is 36 times higher than the threshold shown in FIG. 3A in which multi-mode interactions are taken into account (see section 3 for the threshold of all modes and coupling coefficients). In travelling-wave multi-mode OPOs, it is understood that, in the best case scenario, the threshold is of the order of the single-mode threshold divided by the number of modes [11]. The reason is that the modes in travelling wave resonators have the same nature. Thus, the maximum overlap is achieved if all the modes have the same mode profile [11, 1]. However, in wavelength-scale OPOs, each of the multipolar modes have different spatial distribution, and their overlap through the pump field can potentially lead to a strong coupling even higher than the self coupling (the diagonal terms of $\eta_{lk}$).

As seen in FIGS. 3A-3B, when the OPO goes through a transition from non-degenerate to degenerate oscillation, there is a sudden drop in the threshold. This corresponds to a phase transition from disordered to ordered phases which we have recently demonstrated in travelling wave OPOs [54]. To understand the phase transition in wavelength-scale OPOs, we need to look at the eigenvalues and the eigenvectors of these resonators. For instance, we focus on a degenerate case with a pump excitation at 1900 nm (FIG. 4A). FIGS. 4B and 4C display the real and imaginary parts of the eigenvalues as a function of input power, respectively. Since four modes are involved at signal and idler frequencies, there are eight eigenvalues and eight corresponding supermodes. The OPO threshold for each supermode is defined when the imaginary part of the eigenvalue passes zero (FIG. 4B).

At low input power levels, there is a weak coupling between the eigenmodes as seen in Eq. 1. Hence, each supermode is dominated by a single eigenmode (see section 3 for the eigenvectors). However, when the input power increases, the modes start to interact due to the nonlinear coupling through the pump. As a result, the supermodes near and above the threshold are a superposition of all eigenmodes. The electric field distribution of the four oscillating supermodes at the thresholds are shown in FIG. 4D.

Moreover, due to the detuning of the center of resonance of the eigenmodes from the half-harmonic, the signal/idler supermodes for all eigenvalues are non-degenerate at low input power levels ($Re(\lambda_m)\neq0$) (FIG. 4C). An increase in the input power enhances the internode coupling which can change the signal and idler spectral separation. This can lead to a phase transition from non-degenerate to degenerate and vice versa. Especially at very high powers, the nonlinear coupling dominates over the detuning (Eq. 1), and as a result, all the modes are synchronized at the half-harmonic frequency (FIG. 4C).

The phase transition in the largest eigenvalue is illustrated in FIG. 5. This phase transition is accompanied by an abrupt change in the parametric gain which can be utilized for enhanced sensing and computing [54, 2, 62]. A phase transition can happen due to either the competition between eigenvalues to achieve the highest gain or the coalescence of two eigenvalues. If a critical point is a coalescence of two eigenvalues, the eigenvectors coalesce as well at the critical point (see section 3), which is a signature of exceptional points in non-Hermitian systems [38, 53]. We have shown this type of first-order phase transition in coupled OPOs [54]. However, the phase transition proposed here is observed in a single wavelength-scale OPO due to the strong nonlinear coupling between the multiple modes of the resonator.

To improve the performance of OPOs, it is desired to reduce the oscillation threshold further. The OPO threshold is inversely proportional to the Q factor of the pump mode if only one mode exists at the pump frequency (see section 3). Hence, it is expected to reduce the threshold further by exciting the higher order modes as the higher order multipolar modes have even higher Q factor. FIG. 6A shows the OPO threshold for the first oscillating supermode as a function of the pump wavelength around the 6 magnetic mode at 1110 nm with a Q factor of $10^4$ and the 5 electric mode at 1125 nm with a Q factor of 2500, The separation of the signal/idler frequencies from the half harmonic is shown in FIG. 6B. For the signal and idler we have considered all the modes with a resonant wavelength longer than the pump wavelength (the first 4 electric and the first 5 magnetic modes). The electric field distribution for the pump as well as the first signal/idler supermodes for the magnetic and electric mode excitations are shown in FIGS. 6c and 6d, respectively. The threshold at the center of the resonance of the 6 magnetic mode and the 5 electric mode can reach down to 2 W and 460 W, respectively. Due to the large signal and idler separation, the parametric gain is low. However, at the input power of 43 W around the 6 magnetic mode and the input power of 1900 W around the 5 electric mode, the OPO experiences a phase transition into degenerate regime and the parametric gain is dramatically enhanced (see section 3). Note that for the 5 electric mode, even though the Q is large and high Q modes can also be excited at the signal wavelength, the threshold is not significantly different from the sub-wavelength regime shown in FIGS. 3A-3B. This is because of a weaker field overlap between the pump and signal modes in the absence of phase matching in larger resonators. It is seen in FIG. 6B that because of the competition between different eigenvalues, a phase transition can happen in non-degenerate regime with a sudden change in the signal/idler spectral separation resulting in a discontinuous change in the derivative of the OPO threshold as shown in FIG. 6A.

The approach that we have used to estimate the threshold can also be applied to estimate the second-harmonic generation in multi-mode wavelength-scale resonators (see section 3 for more details). Specifically, if both pump and signal are single mode and the detuning from the eigenfrequencies is negligible, the OPO threshold, and the second-harmonic generation efficiency, $\epsilon_{SHG}$, can be connected as:

$$P_{th} = \frac{4\alpha^{(a)2}}{\alpha^{(b)2}\epsilon_{SHG}} \left( \frac{\frac{\alpha^{(b)2}}{4} + \delta\omega^{(b)2}}{\frac{\alpha^{(a)2}}{4} + \delta\omega^{(a)2}} \right) \approx \frac{4}{\epsilon_{SHG}}. \quad (5)$$

As there is no threshold for SHG process and the conventional detectors are more sensitive at shorter wavelengths [16], it is usually easier to simulate or measure the SHG process. This allows us to estimate the OPO threshold in some structures which have already been proposed for SHG. FIG. 7 displays few examples and the estimated threshold in these structures. The low threshold in inversely designed structure [29] shows the importance of the field overlap to achieve strong nonlinear response. Note that the thresholds reported in FIG. 7 is for a continuous wave sources.

Since the round-trip time in wavelength-scale OPOs is only few femto-seconds and the Q factor compared to micro-resonators is relatively low, the input pump can be compressed in time into a short pulse. This can lead to average-power thresholds of few tens of milliwatts (with a pulse repetition rate of 100 MHz) even for subwavelength OPOs, which is in the order of the threshold for free-space pulsed OPOs [32, 43]. Hence, the oscillation can happen before the onset of the material damage threshold. The field overlap can be further enhanced by Mie resonance engineering, inverse design [39], using hybrid plasmonic structures [45], or controlling evanescent waves [23]. This can potentially help to achieve sub-milliwatt oscillation threshold in subwavelength and wavelength-scale resonators.

In conclusion, we proposed a general theory to estimate the oscillation threshold in wavelength-scale OPOs and the nonlinear mixing behavior of modes above the threshold. We showed that the nonlinear interactions in multi-mode wavelength-scale resonators can be different from their large-scale counterparts and the threshold can be considerably reduced as a result of multi-mode interactions in these resonators. We demonstrated a phase transition in these resonators due to the nonlinear interactions between multiple modes. We have shown that although the phase matching is not required in this regime, the field overlap between modes can play a crucial role in reducing the threshold. Our formalism is general and can predict the behavior of OPO above the threshold if the pump depletion is also taken into account. It can also be applied to $\chi^{(3)}$ cavities. Our approach can enable design of a new class of nonlinear integrated photonic systems.

3. Equation Derivations

In this section, we derive the equations for single-mode and multi-mode OPOs for both degenerate and non-degenerate cases. We derive the second-harmonic generation (SHG) efficiency and establish a connection between the SHG efficiency and the threshold in degenerate OPOs for single mode cases. We discuss the quasi-normal modes for dispersive and non-spherical cases and the role of low-Q background modes on the performance of arbitrarily-shaped OPOs. We provide more details on the parameters, eigenvalues and eigenvectors of the results displayed in the following sections.

a. Wave Equations

The Helmholtz wave equation in presence of nonlinear polarizability can be written as:

$$\nabla^2 \vec{E} = \mu_0 \frac{\partial}{\partial t}\left(\frac{\partial \vec{D}}{\partial t} + \sigma \vec{E}\right) = \mu_0 \varepsilon_0 \varepsilon \frac{\partial^2 \vec{E}}{\partial t^2} + \mu_0 \sigma \frac{\partial \vec{E}}{\partial t} + \frac{\partial^2 \vec{P}_{NL}}{\partial t^2}, \quad (6)$$

where $\varepsilon = n^2$ is the linear relative permittivity, n is the refractive index, and $P_{NL}$ is the nonlinear polarization. To describe nonlinear dynamics in wavelength-scale cavities, we write the electric field as a superposition of the cavity eigenmodes. Instead of the conventional form of spatial SVEA in which the envelope evolves as the wave propagates through the nonlinear medium, we assume that the envelope is stationary in space but slowly evolves in time:

$$\vec{E}(\vec{r}, t) = \varepsilon_a \sum_k \alpha_k(t) e^{-i\left(\omega - i\frac{\alpha_k}{2}\right)t} |\vec{\psi}_k(\vec{r})\rangle + c.c., \quad (7)$$

$$\vec{P}_{NL}(\vec{r}, t) = \sum_k \vec{P}_k(\vec{r}, t) e^{-i\left(\omega - i\frac{\alpha_k}{2}\right)t} + c.c.,$$

where $\varepsilon_\alpha$ is the normalization constant such that $|\alpha_k|^2$ the energy stored in the $k^{th}$ mode of the cavity, and for a homogeneous resonator, it is $\varepsilon_\alpha = \sqrt{2/\varepsilon_0 n(\omega)^2}$, $\vec{P}_k$ is the nonlinear polarization that we explain later, $|\vec{\psi}_k(\vec{r})\rangle$ is the cavity eigenmode normalized such that $\langle \vec{\psi}_m(\vec{r}) \vec{\psi}_k(\vec{r}) \rangle = \delta_{mk}$ ($\delta_{mk}$ is the Kronecker delta), $\omega$ is the angular frequency of the signal, idler or pump, $\alpha_k = \omega_k/Q_k$ is the decay rate of the cavity mode, $\omega_k$ is the eigenfrequency of the k-th mode with a quality factor of $Q_k$.

In the following, we first formulate the nonlinear dynamics for a single-mode OPO at degeneracy, and then we expand the formalism to a multi-mode cavity and non-degenerate case.

By inserting Eq. 7 in to Eq. 6, considering the $k^{th}$ mode is the only mode at the operating frequency, we have:

$$\left\{\nabla^2 + \frac{\omega^2}{\sigma^2}n^2 - \frac{n^2}{\sigma^2}\frac{\partial^2}{\partial t^2} + \frac{2i\left(\omega - i\frac{\alpha_k}{2}\right)}{\sigma^2}n^2\frac{\partial}{\partial t} + \right. \quad (8)$$

$$\left. \frac{i\alpha_k\omega - \alpha_k^2/4}{\sigma^2}n^2 + i\omega\mu_0\sigma + \mu_0\sigma\frac{\partial}{\partial t}\right\}\varepsilon_a\alpha_k(t)|\vec{\psi}_k(\vec{r})\rangle =$$

$$-\mu_0\left(\omega - i\frac{\alpha_k}{2}\right)^2\vec{P}_k + 2i\mu_0\left(\omega - i\frac{\alpha_k}{2}\right)\frac{\partial\vec{P}_k}{\partial t} + \mu_0\frac{\partial^2\vec{P}_k}{\partial t^2}.$$

Because of SVEA $$\omega \gg \alpha_k, \omega P_k \gg \frac{\partial P_k}{\partial t}, \text{ and } \omega\alpha_k \gg \frac{\partial \alpha_k}{\partial t}.$$

Also, if we ignore the effect of the nonlinearity on the dispersion and if we assume that $\omega=\omega_k+\delta\omega_k$ where $\omega_k \gg \delta\omega_k$, we can assume $$\left(\nabla^2 + \frac{\omega_k^2}{\sigma^2}n^2\right)|\vec{\psi}_k(\vec{r})\rangle \approx 0.$$

With these approximations, the wave equation is simplified to:

$$\left\{\frac{2i\omega n^2}{\sigma^2}\frac{\partial}{\partial t} + i\omega\mu_0\alpha_k + \frac{(2\delta\omega_k + i\alpha_k)\omega n^2}{\sigma^2}\right\}\varepsilon_a\alpha_k(t)|\vec{\psi}_k(\vec{r})\rangle = -\mu_0\omega^2\vec{P}_k. \quad (9)$$

Dividing the both sides by $2i\omega n^2/c^2$, we reach:

$$\left\{\frac{\partial}{\partial t} + \frac{\mu_0\sigma c^2}{2} - i\delta\omega_k + \frac{\alpha_k}{2}\right\}\varepsilon_a\alpha_k(t)|\vec{\psi}_k(\vec{r})\rangle = \frac{i\mu_0\omega c^2}{2n^2}\vec{P}_k. \quad (10)$$

Note that we have assumed a weak material dispersion to derive the above equation. For dispersive structures, the evolution of modes need more rigorous analysis [64]. We first implement the nonlinear dynamics to estimate the threshold in single-mode OPOs. Then, we extend our model when the cavity has multiple modes at the signal wavelength. We also applies our model for second-harmonic generation, we show that if the second-harmonic signal is single-mode, we can estimate the threshold from SHG efficiency. This can be helpful to estimate the OPO threshold for the structures which have already been proposed for SHG.

b. Half-Harmonic Generation

By writing the nonlinear polarization, we can find the nonlinear dynamics for different nonlinear processes (e.g. second-harmonic generation and half-harmonic generation). Here, we first focus on the threshold for half-harmonic generation in degenerate OPOs. For simplicity, we ignore the ohmic loss of the modes.

The coupled nonlinear wave equation for signal and pump can be written as:

$$\sum_k\left\{\frac{\partial}{\partial t} - i\delta\omega_k^{(a)} + \frac{\alpha_k^{(a)}}{2}\right\}a_k(t)|\vec{\psi}_k^{(a)}(\vec{r})\rangle = \quad (11)$$

$$\sum_k\frac{i\omega}{2n(\omega)^2}\chi^{(2)}(2\omega,\omega,\omega)\varepsilon_b b(t)a_k^*(t)|\vec{\Psi}^{(b)}(\vec{r})\vec{\psi}_k^{(a)*}(\vec{r})\rangle,$$

$$\left\{\frac{\partial}{\partial t} - i\delta\omega^{(b)} - \frac{\alpha^{(b)}}{2}\right\}b(t)|\vec{\Psi}^{(b)}(\vec{r})\rangle = \quad (12)$$

$$\sum_k\frac{i\omega}{n(2\omega)^2}\chi^{(2)}(2\omega,\omega,\omega)\frac{\varepsilon_a^2}{\varepsilon_b}a_k^2(t)|\vec{\psi}_k^{(a)*}(\vec{r})\rangle.$$

We have defined the electric field for the signal at the fundamental harmonic as $$\vec{E}_\omega = \varepsilon_a\sum a_k(t)e^{-i\left(\omega-i\frac{1}{2}\alpha_k^{(a)}\right)t}|\vec{\psi}_k^{(a)}(\vec{r})\rangle,$$

where $|\vec{\psi}_k^{(a)}(\vec{r})\rangle$ are the eigenmodes of the cavity at $\omega=\omega_k$ with decay constant of $\alpha_k^{(a)}$. The electric field for the pump at second-harmonic is defined as $$\vec{E}_{2\omega} = \varepsilon_b e^{-i\left(2\omega-i\frac{1}{2}\alpha^{(b)}\right)t}b(t)|\vec{\Psi}^{(b)}(\vec{r})\rangle,$$

where $|\vec{\Psi}^{(b)}(\vec{r})\rangle$ is the spatial mode profile of the pump normalized such that $\langle\vec{\Psi}^{(b)}(\vec{r})\vec{\Psi}^{(b)}(\vec{r})\rangle=1$ but, as we explain later, it does not have to be the eigenmode of the cavity and it can be an embedded eigenmode of the cavity, such as Fano, anapole, or bound-state in the continuum modes, b(f), is the envelope of the pump such that $|b|^2$ is the pump power, and $\alpha^{(b)}$ is the decay rate for the pump mode.

i. Single-Mode Cavity

If $|\vec{\psi}_k^{(a)}(\vec{r})\rangle$ is the only mode of the cavity at the operating frequency, by multiplying the both sides of Eqs. 11 and 12 by $\langle\vec{\psi}_k^{(a)}(\vec{r})|$ and $\langle\vec{\Psi}^{(b)}(\vec{r})|$, respectively, and calculating the inner product, the coupled equations are simplified to:

$$\frac{d}{dt}a_k = \left(i\delta\omega_k^{(a)} - \frac{\alpha_k^{(a)}}{2}\right)a_k + i\eta_{kk}ba_k^*, \quad (13)$$

$$\frac{d}{dt}b = \left(i\delta\omega^{(b)} - \frac{\alpha^{(b)}}{2}\right)(b-b_0)i2\eta_{kk}^*a_k^2, \quad (14)$$

where $b_0$ is the pump amplitude in the absence of the nonlinearity and $\eta_{lk}$ is the effective nonlinear coupling defined as:

$$\eta_{lk} = \omega\left\langle\frac{\varepsilon_b\chi^{(2)}}{n(\omega)^2}\vec{\psi}_l^{(a)*}(\vec{r})\vec{\Psi}^{(b)}(\vec{r})\vec{\psi}_k^{(a)*}(\vec{r})\right\rangle. \quad (15)$$

Near the OPO threshold, we can assume that the pump is not depleted ($b=b_0$). Above threshold, Eqs. 13 and 14 must be solved simultaneously. The steady-state amplitude of the signal is the solution of Eq. 13 when $d\alpha_k/dt=0$. There are two solutions: one of them is the trivial solution, $\alpha_k=0$, which represents the OPO below the threshold; the nontrivial solution which represents the OPO at threshold. This requires that the amplitude and phase of the pump satisfy these conditions:

$$|\eta_{kk} b_0| \sin(\phi_b - 2\phi_k) = \frac{\alpha_k^{(a)}}{2}, \qquad (16)$$

$$|\eta_{kk} b_0| \cos(\phi_b - 2\phi_k) = -\delta\omega_k^{(a)},$$

where $\phi_k$ and $\phi_b$ are the phase of the signal mode and the pump mode, respectively. As far as the threshold power is concerned, the above equation can be written in a more compact form [18, 51]:

$$|b_0|^2 = \frac{1}{|\eta_{kk}|^2}\left(\frac{\alpha_k^{(a)2}}{4} + \delta\omega_k^{(a)2}\right). \qquad (17)$$

If there is only one coupling channel between the input source and the cavity mode at the pump frequency, in the weak coupling regime ($Q_k \gg 1$), the coupling between the input source and the pump cavity mode in the steady-state can be written as [51]:

$$|b_0|^2 = \frac{\alpha^{(b)}}{\frac{\alpha^{(b)2}}{4} + \delta\omega^{(b)2}} P_{in}. \qquad (18)$$

Hence, the threshold for the input source to go above threshold is:

$$P_{th} = \frac{1}{\alpha^{(b)}|\eta_{kk}|^2}\left(\frac{\alpha_k^{(a)2}}{4} + \delta\omega_k^{(a)2}\right)\left(\frac{\alpha^{(b)2}}{4} + \delta\omega^{(b)2}\right). \qquad (19)$$

If there are more than one coupling channel between the input and the cavity, such as the excitation from the free-space. Eq. 19 is not accurate, and the coupling between the input power and the pump mode amplitude, $b_0$, should be derived from the linear analysis of the cavity at the pump frequency.

ii. Multi-Mode Cavity

For wavelength-scale cavities, the quality factor of the modes are usually low. Hence, at operating wavelength more than one can resonate. If the cavity is multi-mode at the operating wavelength, by multiplying the both sides of Eq. 11 by $\langle \vec{\psi}_l^{(a)}(\vec{r}) \rangle$, the coupled equation is simplified to:

$$\frac{d}{dt}a_l = \left(i\delta\omega_l^{(a)} - \frac{\alpha_l^{(a)}}{2}\right)a_l + ib\sum_k \eta_{lk} a_k^*. \qquad (20)$$

The steady-state response of this equation can be written in a matrix form as:

$$\mathcal{H}_{(b)}[\alpha_1, \alpha_1^s, \ldots, \alpha_k, \alpha_k^s, \ldots]^T = 0. \qquad (21)$$

The OPO threshold is the minimum pump power for which the determinant of the matrix passes zero. Near the threshold, that is the only oscillating mode and the eigenvector correspond to that eigenvector describes the spatial distribution of the signal. The phase difference between each mode of the pulse and the pump is set automatically to achieve the minimum threshold. There is no closed form solution for the eigenvalue if the quality factors of the modes or the central frequencies of all modes are not the same. However, in the best case scenario where all the modes have similar nonlinear coupling coefficient and quality factor, the threshold is reduced by a factor which is the number of modes.

Figure 6:
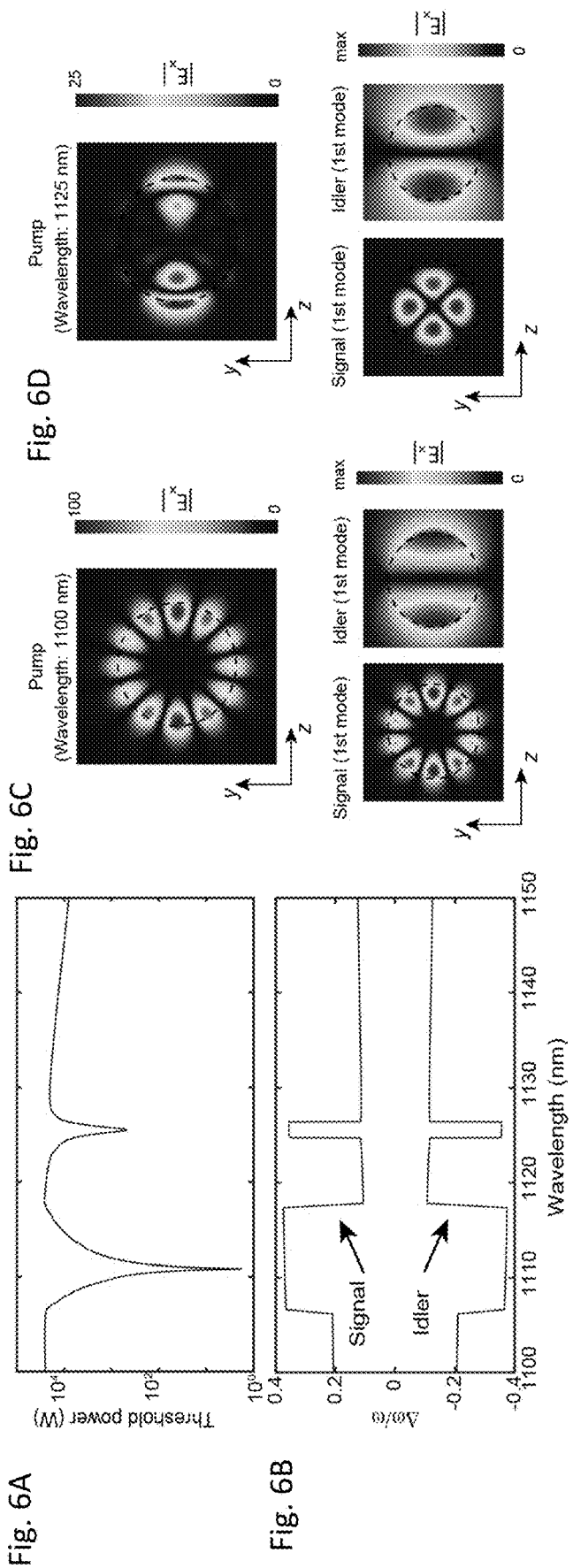

As seen in FIGS. 3 and 6 in sections 1 and 2, the threshold for degenerate OPO is not always lower than the non-degenerate case. Hence, it is crucial to consider non-degenerate cases as well, If signal and idler modes are non-degenerate, Eq. 20 is changed to:

$$\frac{d}{dt}a_l^{(s)} = \left(i\delta\omega_l^{(a)} - \frac{\alpha_l^{(a)}}{2}\right)a_l^{(s)} + ib\sum_k \eta_{lk} a_k^{(i)*}, \qquad (22)$$

where $\alpha_l^{(s)}$ and $\alpha_l^{(s)}$, represent the envelope of the $l^{th}$ signal and idler mode, respectively. In this case, the eigenvalues are not necessarily real, and the steady-state response can be oscillatory. As a result, the eigenvalue problem of Eq. 21 is changed to:

$$\frac{d}{dt}\mathcal{A}(t) = \mathcal{H}(b)\mathcal{A}(t)$$

(23)

where $\mathcal{A}(t) = [\alpha_1^{(s)}, \alpha_1^{(i)s}, \ldots, \alpha_k^{(s)}, \alpha_k^{(i)s}, \ldots]^T$. The electric field for both degenerate and non-degenerate cases can be written as:

$$\vec{E}_\omega(\vec{r}, t) = \qquad (24)$$

$$e^{-i\omega t}\sum_m \left(e^{-i\lambda_m t}\sum_k \alpha_{k,m}^{(2)}|\vec{\psi}_k^{(a)}(\vec{r})\rangle + e^{+i\lambda_m t}\sum_k \alpha_{k,m}^{(i)*}|\vec{\psi}_k^{(a)}(\vec{r})\rangle\right) + c.c.,$$

where $[\lambda_m]$ are the eigenvalues and $\vec{V}_m = [\alpha_{k,m}^{(s,i)}]$ are the corresponding eigenvectors of the Hamiltonian ($\mathcal{H}$) which define the signal/idler supermodes.

c. Second-Harmonic Generation

We can implement the same approach for calculating the SHG in cavities. However, for SHG, we have to expand the second-harmonic mode into the eigenmodes of the cavity while the pump input at fundamental harmonic can be an embedded mode of the cavity. If we ignore the back conversion, the nonlinear dynamic for SHG process can be written as:

$$\sum_k \left\{\frac{\partial}{\partial t} - i\delta\omega^{(b_k)} + \frac{\alpha_k^{(b)}}{2}\right\} b_k(t)|\vec{\psi}_k^{(b)}(\vec{r})\rangle = \qquad (25)$$

$$\frac{i\omega}{n^2}\chi^{(2)}(2\omega, \omega, \omega)a^2(t)|\vec{\Psi}^{(a)}(\vec{r})\rangle^2.$$

By multiplying the both sides by Eq. 25 is simplified to:

$$\frac{d}{dt}b_k = \left(i\delta\omega_k^{(b)} - \frac{\alpha_k^{(b)}}{2}\right)b_k + i2\tilde{\eta}_k^* a^2, \qquad (26)$$

where $$\tilde{\eta}_k = \omega \left( \varepsilon \frac{\chi^{(2)}}{n^2} \vec{\Psi}^{(a)*}(\vec{r})^2 \vec{\psi}_k^{(b)}(\vec{r}) \right).$$

If we assume that the pump is constant $(a(t)=\alpha_0)$, the steady-state second-harmonic generated power is:

$$|b_k|^2 = \frac{4\tilde{\eta}_k^2}{\frac{\alpha_k^{(b)2}}{4} + \delta\omega_k^{(b)2}} |a_0|^4 \qquad (27)$$

If there is only one coupling channel between the input and the cavity mode at the fundamental frequency, the cavity mode amplitude can be written as the input power as:

$$|a_0|^2 = \frac{\alpha^{(a)}}{\frac{\alpha^{(a)2}}{4} + \delta\omega^{(a)2}} P_{in}, \qquad (28)$$

$$|b_k|^2 = \frac{\alpha_k^{(b)}}{\frac{\alpha_k^{(b)2}}{4} + \delta\omega_k^{(b)2}} P_{SHG,k},$$

By inserting Eq. 28 in to Eq. 27, the second-harmonic power can be expressed as $P_{SHG,k} = \epsilon_{SHG,k} P_{in}^2$, where $\epsilon_{SHG}$ is the SHG efficiency in the unit of $W^{-1}$ written as:

$$\epsilon_{SHG,k} = \frac{4\tilde{\eta}_k^2 \alpha^{(a)2}}{\alpha_k^{(b)} \left( \frac{\alpha^{(a)2}}{4} + \delta\omega^{(a)2} \right)^2}. \qquad (29)$$

If the cavity is single mode at both the fundamental and second harmonic, $\tilde{\eta}_k = \eta_{kk}$. This allows us to connect the SHG efficiency to the nonlinear coupling coefficient. Hence, by knowing the linear response of the cavity and SHG efficiency, we can derive the OPO threshold by inserting Eq. 29 into Eq. 19:

$$P_{th} = \frac{4\alpha^{(a)2}}{\alpha^{(b)2} \epsilon_{SHG}} \left( \frac{\frac{\alpha^{(b)2}}{4} + \delta\omega^{(b)2}}{\frac{\alpha^{(a)2}}{4} + \delta\omega^{(a)2}} \right) \approx \frac{4}{\epsilon_{SHG}}. \qquad (30)$$

d. OPO in Spherical Dielectric Particle tw The nonlinear coupling term in Eq. 15 for the particle shown in FIGS. 3A-3B in when the pump is at the resonant frequency of the 3 magnetic mode is calculated as:

$$|\eta_{lk}| = 10^4 \times \begin{bmatrix} 0.5958 & 1.2898 & 1.1236 & 0.2458 \\ 1.2898 & 0.0454 & 0.1493 & 2.4897 \\ 1.1236 & 0.1493 & 0.4892 & 8.5686 \\ 0.2458 & 2.4897 & 8.5686 & 0.7508 \end{bmatrix} \qquad (31)$$

The modes are ordered as: ED, EQ, MD, and MQ. It is seen that the off-diagonal terms can be even stronger than the diagonal terms. If we ignore intermode coupling (off-diagonal terms), the threshold for these modes are: 3.99, 2783, 0.27, and 3.65 MW, respectively. However, due to the strong intermode coupling, which can be even stronger than the diagonal terms based on Eq. 33, the threshold is reduced 36-fold as shown in FIGS. 3A-3B.

For the wavelength-scale OPO reported in FIG. 6A-6D, there are 9 eigenmodes involved. The resonant wavelength of these modes are: 2589, 1923, 1541, 1297, 3404, 2374, 1829, 1498, and 1273 nm. The first 4 modes are the electric modes and the last 5 modes are the magnetic modes. They are sorted from the lowest order to the highest order. The Q factor of these modes are 4, 19, 100, 520, 9, 37, 141, 600, and 2500, respectively. The nonlinear coupling teen for the pump excitation at 1110 nm is:

$$|\eta_{lk}| = 10^4 \times \begin{bmatrix} 0.2 & 0.6 & 0.6 & 0.5 & 0.1 & 0.6 & 0.5 & 4.4 & 0.1 \\ 0.6 & 0.5 & 0.3 & 2.7 & 0.5 & 0.8 & 7.0 & 0.5 & 37.9 \\ 0.6 & 0.3 & 2.7 & 0.1 & 0.9 & 8.8 & 1.1 & 18.7 & 0.6 \\ 0.5 & 2.7 & 0.1 & 14.2 & 8.2 & 1.1 & 5.9 & 1.2 & 18.5 \\ 0.1 & 0.5 & 0.9 & 8.2 & 0.5 & 0.2 & 0.8 & 0.1 & 118 \\ 0.6 & 0.8 & 8.8 & 1.1 & 0.2 & 0.6 & 0.5 & 146 & 0.5 \\ 0.5 & 7.0 & 1.1 & 5.9 & 0.8 & 0.5 & 149 & 0.3 & 33.1 \\ 4.4 & 0.5 & 18.7 & 1.2 & 0.1 & 146 & 0.3 & 36.4 & 0.1 \\ 0.1 & 37.9 & 0.6 & 18.5 & 118 & 0.5 & 33.1 & 0.1 & 22.8 \end{bmatrix} \qquad (32)$$

The nonlinear coupling term for the pump excitation at 1125 nm is:

$$|\eta_{lk}| = 10^4 \times \begin{bmatrix} 0.4 & 0.6 & 6.5 & 0.6 & 0.1 & 1.1 & 0.7 & 8.1 & 0.2 \\ 0.6 & 5.8 & 0.3 & 7.0 & 2.5 & 1.0 & 6.3 & 0.7 & 6.7 \\ 6.5 & 0.3 & 8.3 & 0.1 & 1.1 & 9.3 & 1.1 & 8.7 & 0.8 \\ 0.6 & 7.0 & 0.1 & 2.7 & 15.5 & 1.2 & 12.5 & 1.4 & 9.2 \\ 0.1 & 2.5 & 1.1 & 15.5 & 0.3 & 0.3 & 7.2 & 0.1 & 2.6 \\ 1.1 & 1.0 & 9.3 & 1.2 & 0.3 & 7.3 & 0.6 & 1.9 & 0.5 \\ 0.7 & 6.3 & 1.1 & 12.5 & 7.2 & 0.6 & 1.8 & 0.5 & 1.5 \\ 8.1 & 0.7 & 8.7 & 1.4 & 0.1 & 1.9 & 0.5 & 2.0 & 0.3 \\ 0.2 & 6.7 & 0.8 & 9.2 & 2.6 & 0.5 & 1.5 & 0.3 & 3.0 \end{bmatrix} \qquad (33)$$

The eigenvalues at these two wavelengths are shown in FIG. 8. It is seen that at the threshold, since the signal and idler frequency separation is large, the parametric gain is low. However, when a phase transition from non-degenerate to degenerate case occurs, the gain boosts rapidly.

e. The Evolution of Supermodes

The supermodes are the eigenvectors of $\mathcal{H}(b)$, The eigenvectors for all eigenvalues are displayed in FIGS. 9A-9B. The odd and even numbers correspond to the signal and idler modes, respectively. The eigenvectors, $\alpha_{k,m}^{(a)}$, corresponding to the eigenvalues illustrated in FIG. 4A-4D is displayed in FIGS. 10A-10B.

f. Quasi-Normal Mode Formulation

The expansion of fields in a 3D resonator to multi-polar Mie resonances, which we have used above, satisfies orthogonality and completeness only for spherical and non-dispersive structures. Hence, it cannot be applied to the general case of a resonator with an arbitrary shape. For a dispersive material, the conventional form of source-free Maxwell's equations cannot be written as a standard linear eigenproblem [64]. Recently, Lorentz reciprocity theorem [28, 55] has been proposed to find the linear response of arbitrarily shaped plasmonic and dielectric resonators composed of a material with single-pole Lorentz dispersion in the form of $$\varepsilon(\omega) = \varepsilon_\infty \left(1 - \frac{\omega_p^2}{\omega^2 - \omega_o^2 + i\gamma\omega}\right).$$

In this approach, two auxiliary fields are introduced: the polarization, $$\vec{P} = -\varepsilon_\infty \left(1 - \frac{\omega_p^2}{\omega^2 - \omega_o^2 + i\gamma\omega}\right)\vec{E},$$

and the current density, $\vec{J} = -i\omega\vec{P}$, to reformulate the Maxwell's equation in a linear form [28]:

$$\begin{bmatrix} 0 & -i\mu_0^{-1}\nabla\times & 0 & 0 \\ i\varepsilon_\infty^{-1}\nabla\times & 0 & 0 & -i\varepsilon_\infty^{-1} \\ 0 & 0 & 0 & i \\ 0 & i\omega_p^2\varepsilon_\infty & -i\omega_o^2 & -i\gamma \end{bmatrix} \begin{bmatrix} \vec{E}_m \\ \vec{H}_m \\ \vec{P}_m \\ \vec{J}_m \end{bmatrix} = \omega_m \begin{bmatrix} \vec{E}_m \\ \vec{H}_m \\ \vec{P}_m \\ \vec{J}_m \end{bmatrix}. \quad (34)$$

By applying proper boundary conditions [64], this approach can be used to precisely find quasi-normal modes for an arbitrarily shaped 3D resonator. Beside the quasi-normal modes, this approach can find a continuum of background modes which depends on the boundary conditions, and can form a complete basis combined with quasi-normal modes.

Because of the low Q nature of the background mode, their contribution on the OPO threshold is negligible. However, they can change the field distribution of supermodes and their spectral response above the threshold. The connection between the quasi-normal modes and the density of states, $\rho(\omega)$ has been discussed in previous works [55, 42].

If we have a continuum of states, the summation in Eq. 22 is converted to an integral form as:

$$\frac{d}{dt}a_i^{(s)} = \left(i\delta\omega_i^{(a)} - \frac{\alpha_i^{(a)}}{2}\right)a_i^{(s)} + ib\int d\omega\rho(\omega)\eta_{i\omega}\alpha_\omega^{(i)s}. \quad (35)$$

Since the effect of low-Q background modes are negligible, to simplify the numerical calculations, we can discretize Eq. 35 around the quasi-normal modes:

$$\frac{d}{dt}a_i^{(s)} = \left(i\delta\omega_i^{(a)} - \frac{\alpha_i^{(a)}}{2}\right)a_i^{(s)} + ib\sum_k \int d\omega\rho_k(\omega)\eta_{ik}\alpha_k^{(i)s}, \quad (36)$$

where $\rho_k(\omega)$ is the density of states around the resonant frequency of the $k^{th}$ quasi-normal mode of the resonator.

4. Example Practical Realizations of OPOs

FIGS. 1A, 2B, 11C, 12A, and 13A-13B illustrate examples of an OPO comprising a resonator 100 including a material 102 having a nonlinear susceptibility generating an output electromagnetic field 104 in response to a pump electromagnetic field 106 inputted into the material. The output electromagnetic field has one or more output wavelengths longer than one or more pump wavelengths of the pump electromagnetic field. The resonator has dimensions 108 (e.g., at least one of a diameter, width, length or height) less than, or on the order of (within a factor of 2), the one or more output wavelengths in free space. Example dimensions include, but are not limited to, a largest of the dimensions 110 being less than 10 micrometers or the resonator fitting within a sphere or spherical volume having a radius of 5 microns.

a. Particle Example

FIGS. 1A and 2A illustrate an example wherein the resonator comprises a particle 200 having the dimensions 108, 110. FIG. 4A illustrates an example wherein the particle supports one or more quasi normal electromagnetic modes 400 of the pump electromagnetic field. FIG. 4D illustrates an example wherein the particle supports one or more quasi normal electromagnetic modes 402 of the output electromagnetic field. FIGS. 4A and 4D further illustrate the quasi normal electromagnetic modes comprise one or more multi polar Mie resonances comprising the output electromagnetic field. In various examples, the particle (e.g., nanoparticle or microparticle) has an arbitrary shape or cross-section. In one or more examples, the material comprises at least one of a metal, a dielectric, a semiconductor, or a polymer.

b. Plasmonic Resonator Example

FIG. 11A illustrates an example wherein the resonator comprises a plasmonic resonator 1100 supporting one or more plasmonic modes 1101 (see FIGS. 11C and 11D) of at least one of the pump electromagnetic field 106 or the output electromagnetic field 104. The resonator further comprises a structure 1102 including a gap 1104 that supports a plasmonic mode overlapping with the material 102. In one or more examples, the structure 1102 comprises a patterned metal layer 1106 deposited on the material 102. FIG. 11A further illustrates patterned metal forming input coupler 1108 coupling the pump electromagnetic field into the resonator, and output coupler 1110 coupling the output electromagnetic field 104 out of the resonator. In one or more examples, the material comprises a dielectric, a semiconductor, or a polymer and the structure defining the gap on the material comprises a patterned metal layer.

FIG. 11A further illustrates an example wherein the resonator includes an additional material 1112 having a different optical property (e.g., dielectric constant) than the material 102. In the example of FIG. 11a, the additional material 1112 is positioned on top of the gap 1104 and the material 102, although other configurations are possible. In some examples, the resonator has a structure 1102 tailored for, or accounting for, a first interaction of the pump electromagnetic field and a second interaction of the output electromagnetic field with the additional material 1112 and the material 102, so as to increase an efficiency of a parametric interaction of the pump electromagnetic field and the output electromagnetic field as compared to without the additional material 1112. In one or more examples, the parametric interaction is a non-linear interaction between the pump electromagnetic field and the output electromagnetic field and the parametric interaction is mediated by the material and/or the additional material. Example additional materials include, but are not limited to, a polymer, a glass, a linear material, or material having an index of refraction less than 2.

Table 1 compares performance of wavelength-scale OPOs plasmonic resonators in practice and with reasonable oscillation threshold.

TABLE 1

Estimated OPO threshold in hybrid plasmonic
LiNbO₃ structures shown in FIG. 11.
The threshold is defined as the input power at the beginning of
the slot in plasmonic resonators.

| Structure | $\eta_{SHG}$ (%/Wcm²) | OPO Threshold (W) |
|---|---|---|
| Polymer (Filled) | 3e+07 | 0.4 |
| Polymer (Unfilled) | 4.4e+05 | 28 |
| LN Substrate | 1.2e+04 | 1e+3 |
| LN Substrate (Filled gap) | 6.1e+05 | 20 |

11. The threshold is defined as the input power at the beginning of the slot in plasmonic resonators.

c. Dielectric Resonator Example

FIG. 12A illustrates an example wherein the resonator 100 comprises a dielectric resonator 1200.

e. Inversely Designed Example

FIG. 13A illustrates an example of an of inversely designed OPO comprising a plurality of regions 1300 (e.g., pixels) each including different dielectric constants and dimensions (e.g., thicknesses 1302) arranged to tailor an overlap of the pump electromagnetic field and the output electromagnetic field. In one example, the resonator structure is optimized to have the maximum field overlap between the pump and the signal with high quality factors at the signal and the pump wavelengths. In one example, to optimize the wavelength-scale OPO, the structure is discretized to small pixels. Each pixel can be either a high index/nonlinear material 1304 (blue, e.g., comprising material 102 having nonlinear susceptibility) or a low index material 1306 (e.g., air). Using an optimization algorithm, we can find the best configuration of the pixels to have the lowest OPO threshold. The structure can be in/out coupled from the free space or through waveguides, for example.

f. Example Networks of OPOs

FIG. 14A illustrates an example of OPO network 1400 including a plurality of OPOs wherein the resonators are coupled evanescently and FIG. 14B illustrates how the modes of OPOs (the output electromagnetic fields of signal (s) and idler (i)) in FIG. 14A) are coupled. In general, the OPOs can be evanescently coupled (via an evanescent wave or field) or coupled through couplings 1402. Example couplings include, but are not limited to, waveguides a waveguide between each pair of resonators) or auxiliary cavities (e.g., a cavity containing two or more resonators). In some examples, each of the resonators are pumped by a pump outputting the electromagnetic field with different phases and/or different amplitudes.

In one or more examples, the time evolution of the output electromagnetic fields (signal s and idler i) outputted from each of the OPOs are given by $$\frac{d}{dt}a_m^{(s)} = \left(i\delta\omega_m - \frac{\alpha_m}{2}\right)a_m^{(s)} + i\sum_l\sum_n \eta_{lmn}b_l a_n^{(i)*}$$

$$\frac{d}{dt}a_n^{(i)*} = \left(-i\delta\omega_n - \frac{\alpha_n}{2}\right)a_n^{(i)*} - i\sum_l\sum_n \eta_{lmn}^* b_l^* a_n^{(s)}$$

(symbols defined in the sections above) and the coupling $\gamma$ between OPOs is given by:

$\gamma_{m_s,n_i} = ib_m\eta_{mnm}$ $\gamma_{m_i,n_s} = -ib_m^*\eta_{mnm}^* = \gamma_{m_s,n_i}^*$ $\gamma_{m_s,n_i} = ib_m\eta_{mnm} + ib_n\eta_{mnm}$ $\gamma_{n_i,m_s} = \gamma_{m_s,n_i}^*$ In one or more examples, a sensor includes the network of OPOs of FIG. 14A and one or more detectors 1404 coupled to the OPOs so as detect the output electromagnetic field, thereby sensing at least one of the pump electromagnetic field or an environment around the network via a detection of the output electromagnetic field by the detector.

In one or more examples, the couplings 1402 are adjusted to model an array of coupled spins, so that a minimum threshold of the OPO network corresponds to the minimum energy configuration of coupled spins in the array. Finding the minimum energy of a designed spin configuration can be mapped to various optimization problems in biology, medicine, wireless communications, artificial intelligence and social networks. In one or more examples, the coupling between the OPOs is used to perform calculations in an optical computer.

5. Process Steps

Method of Making

FIG. 15 is a flowchart illustrating a method of making an optical parametric oscillator.

Block 1500 represents providing a resonator comprising a material having a nonlinear susceptibility generating an output electromagnetic field in response to a pump electromagnetic field inputted into the material. The output electromagnetic field has one or more output wavelengths longer than one or more pump wavelengths of the pump electromagnetic field. The resonator has dimensions less than, or on the order of, the one or more output wavelengths in free space (e.g., the air or environment outside the material).

In one or more examples, the resonator is formed using a lithographic process and etching to remove a portion of a film.

In one or more examples, the resonator is designed using an inverse design process, wherein a plurality of regions having different dielectric constants and thicknesses are arranged to optimize or tailor an overlap of the pump electromagnetic field and the output electromagnetic field and/or reduce oscillation threshold for the OPO.

Block 1502 represents the end result, an OPO. The OPO can be embodied in many ways including, but not limited to, the following (referring also to FIGS. 1A, 2A, 4A-4D, 11, 12A, 14A, 14B).

1. A device including one or more optical parametric oscillators (OPOs), each of the OPOs comprising:
a resonator 100 comprising a material 102 having a nonlinear susceptibility generating an output electromagnetic field 104 in response to a pump electromagnetic field 106 inputted into the material 102, wherein:
the output electromagnetic field 104 has one or more output wavelengths longer than one or more pump wavelengths of the pump electromagnetic field, and
the resonator has dimensions 108 less than, or on the order of, the one or more output wavelengths in free space.

2. The device of example 1, wherein the resonator comprises a particle 200 having the dimensions 110.

3. The device of example 1 or 2, wherein the resonator supports one or more plasmonic modes 1101 of at least one of the pump electromagnetic field or the output electromagnetic field. In one or more examples, the resonator supports plasmons confining the pump and/or the output in resonator.

4. The device of any of the examples 1 or 3, wherein the resonator comprises a structure 1102 including a gap 1104 that supports a plasmonic mode that overlaps with the material.

5. The device of example 4, further comprising an additional material 1112 having a second order nonlinear susceptibility on top of the gap 1104.

6. The device of any of the examples 1-5, wherein the resonator includes an additional material 1112 having different optical properties (e.g., dielectric constant) than the material and the resonator has a structure (e.g., shape and/or dimension) tailored for and accounting for a first interaction of the pump electromagnetic field and a second interaction of the output electromagnetic field with the additional material and the material, so as to increase an efficiency of a parametric interaction of the pump electromagnetic field and the output electromagnetic field as compared to without the additional material.

7. The device of any of the examples 1-6, wherein the resonator includes an additional material 1112 comprising or consisting essentially of at least one of a polymer, a glass, a linear material, or an index of refraction less than 2. In example, a linear material is defined as not having a second order susceptibility. In another example, the linear material is defined as a material that is not "non-linear."

8. The device of any of the examples 5-7, wherein the additional material 1112 comprises a polymer.

9. The device of any of the examples 1-8, wherein the resonator includes a plurality of regions or pixels 1300 including different dielectric constants and thicknesses 1302 arranged to optimize or tailor an overlap of the pump electromagnetic field 106 and the output electromagnetic field 104 and/or reduce oscillation threshold for the OPO.

10. The device of any of the examples 1-9, wherein a largest of the dimensions 110 is less than 10 microns or the resonator fits within a sphere having a radius of 5 microns.

11. The device of any of the examples 1-10, wherein resonator supports one or more quasi normal electromagnetic modes 400, 402 of the pump electromagnetic field 106 and/or quasi normal electromagnetic modes of the output electromagnetic field 104.

12. The device of example 11, wherein the quasi normal electromagnetic modes comprise one or more multi polar Mie resonances comprising the output electromagnetic field.

13. The device of any of the examples 1-12, further comprising a disk, a cylinder 1201 (FIG. 12*a*), or a sphere 201 (FIG. 2*a*) including the resonator.

14. The device of any of the examples 1-13, wherein the resonator has an polygonal cross section or an arbitrary cross section (e.g., circular or irregular cross-section).

15. The device of any of the examples 1-14, wherein the resonator is lithographically, patterned.

16, The device of any of the examples 1-15, wherein the material 102 comprises at least one of a metal, a dielectric, a semiconductor, or a polymer.

17. The device of any of the examples 1-16, wherein the material 102 has at least one of a second order susceptibility $\chi^{(2)}$ or third order susceptibility $\chi^{(3)}$.

18. The device of any of the examples 1-17, comprising a plurality 1400 of the OPOs wherein the resonators are evanescently coupled 1402 or coupled 1402 through waveguides or auxiliary cavities.

19. The device of any of the examples, comprising a plurality of the OPOs outputting a plurality of output electromagnetic fields 104 in response to a plurality of the pump electromagnetic fields 106, each of the pump electromagnetic fields having at least one of a phase or an amplitude that is different from the phase or the amplitude of another of the pump electromagnetic fields.

20. A sensor comprising a network including a plurality 1400 of the OPOs of any of the examples 1-19 and one or more detectors 1404 coupled to detect the output electromagnetic field 104, thereby sensing the pump electromagnetic field or the environment around the network via a detection of the output electromagnetic field by the detector.

21. An optical computer, comprising:
a network 1400 including a plurality of the OPOs of claim 1; and
couplings 1402 between the OPOs, wherein the couplings are adjusted to model an array of coupled spins, so that a minimum threshold of each of the OPOs corresponds to a minimum energy configuration of one of the coupled spins in the array.

22. In one or more examples, the resonator is a structure having one or more optical properties and a shape configured to support one or more resonances of the output electromagnetic field and/or the pump electromagnetic field.

23. Example wavelengths for the pump electromagnetic field (e.g., comprising pump electromagnetic wave) and the output electromagnetic field (e.g., comprising pump electromagnetic wave) include, but are not limited to, wavelengths in a range from ultraviolet to mid-infrared.

24. In one or more examples, the output electromagnetic field comprises a signal (s) wave/field and idler (i) wave/field.

Method of Operating

FIG. 16 illustrates a method of operating an OPO comprising the following steps.

Block 1600 represents inputting a pump electromagnetic field into a resonator comprising a material having a non-linear susceptibility generating an output electromagnetic field in response to the pump electromagnetic field. As illustrated herein, the output electromagnetic field has one or more output wavelengths longer than one or more pump wavelengths of the pump electromagnetic field, and the resonator has dimensions less than, or on the order of, the one or more output wavelengths in free space.

Block 1602 represents configuring the OPO for at least one of the following:
(1) the OPO operating at degeneracy such that at least one of the output wavelengths is twice at least one of the pump wavelengths,
(2) the output electromagnetic field comprising a frequency comb comprising a set of equidistant frequency peaks,
(3) the output electromagnetic field has an output spectrum broader than an input spectrum of the pump electromagnetic field, in frequency units measured at the 30-dB level below the peak, or
(4) the pump electromagnetic field comprising a continuous wave, a time varying, or a pulsed electromagnetic field.

The OPO can be any of the OPOs of examples 1-22 above.

REFERENCES

[1] G B Alves, R F Barros, D S Tasca, C E R Souza, and A Z Khoury. Conditions for optical parametric oscillation with a structured light pump. *Physical Review A*, 98(6): 063825, 2018.

[2] Frank Arute, Kunal Arya, Ryan Babbush, Dave Bacon, Joseph C Bardin, Rami Barends, Rupak Biswas, Sergio Boixo, Fernando G S L Brandao, David A Buell, et al. Quantum supremacy using a programmable superconducting processor. *Nature*, 574(7779):505-510, 2019.

[3] Denis G Baranov, Dmitry A Zuev, Sergey I Lepeshov, Oleg V Kotov, Alexander E Krasnok, Andrey B Evlyukhin, and Boris N Chichkov, nanophotonics: the quest for better materials and fabrication techniques. *Optica,* 4(7):814-825, 2017.

[4] Ingo Breunig. Three-wave mixing in whispering gallery resonators. *Laser & Photonics Reviews,* 10(4):569-587, 2016.

[5] Alexander W Bruch, Xianwen Liu, Joshua B Surya, Chang-Ling Zou, and Hong X Tang. On-chip χ(2) microring optical parametric oscillator. *Optica,* 6(10):1361-1366, 2019.

[6] Sonia Buckley, Marina Radulaski, Jingyuan Linda Zhang, Jan Petykiewicz, Klaus Biermann, and Jelena Vučković. Multimode nanobeam cavities for nonlinear optics: high quality resonances separated by an octave. *Optics express,* 22(22):26498-26509, 2014.

[7] Luca. Carletti, Kirill Koshelev, Costantino De Angelis, and Yuri Kivshar. Giant nonlinear response at the nanoscale driven by bound states in the continuum. *Physical review letters,* 121(3):033903, 2018.

[8] Moran Chen, Nicolas C Menicucci, and Olivier Pfister. Experimental realization of multipartite entanglement of 60 modes of a quantum optical frequency comb. *Physical review letters,* 112(12):120505, 2014.

[9] Alessandro Ciattoni, Andrea Marini, Carlo Rizza, and Claudio Conti. Phase-matching-free parametric oscillators based on two-dimensional semiconductors. *Light: Science & Applications,* 7(1):5, 2018.

[10] Claudio Conti, Andrea Di Falco, and Gaetano Assanto. Optical parametric oscillations in isotropic photonic crystals. *Optics express,* 12(5):823-828, 2004.

[11] German J De Valcarcel, Giuseppe Patera, Nicolas Treps, and Claude Fabre. Multimode squeezing of frequency combs. *Physical Review A,* 74(6):061801, 2006.

[12] Robert C Eckardt, C D Nabors, William J Kozlovsky, and Robert L Byer. Optical parametric oscillator frequency tuning and control, *JOSA B,* 8(3):646-667, 1991.

[13] Claude Fabre, E Giacobino, A Heidmann, L Lugiato, S Reynaud, M Vadacchino, and Wang Kaige. Squeezing in detuned degenerate optical parametric oscillators. *Quantum Optics: Journal of the European Optical Society Part* 13, 2(2):159, 1990.

[14] Carlo Gigli, Tong Wu, Giuseppe Marino, Adrien Borne, Giuseppe Leo, and Philippe Lalanne. Quasinormal-mode non-hermitian modeling and design in nonlinear nanooptics. *ACS Photonics,* 2020.

[15] V F Gili, L Carletti, A Locatelli, D Rocco, Marco Finazzi, Lavinia Ghirardini, I Favero; C Gomez, A Lema1 3053'ftre, Michele Celebrano, et al. Monolithic algaas second-harmonic nanoantennas. *Optics Express,* 24(14):15965-15971, 2016.

[16] Robert H Hadfield. Single-photon detectors for optical quantum information applications. *Nature photonics,* 3(12):696, 2009.

[17] Ryan Hamerly, Alireza Marandi, Marc Jankowski, Martin M Fejer, Yoshihisa Yamamoto, and Hideo Mabuchi. Reduced models and design principles for half harmonic generation in synchronously pumped optical parametric oscillators. *Physical Review A,* 94(6):063809, 2016,

[18] Hermann A Haus. *Waves and fields in optoelectronics.* Prentice-Hall 1954.

[19] Tobias Herr, Victor Brasch, John D Jost, Christine Y Wang, Nikita M Kondratiev, Michael L Gorodetsky, and Tobias J Kippenberg. Temporal solitons in optical microresonators. *Nature Photonics,* 8(2):145-152, 2014.

[20] Takahiro Inagaki, Kensuke Inaba, Ryan Hamerly, Kyo Inoue, Yoshihisa Yamamoto, and Hiroki Takesue. Large-scale ising spin network based on degenerate optical parametric oscillators, *Nature Photonics,* 10(6):415, 2016.

[21] Saman Jahani and Zubin Jacob. Transparent subdiffraction optics: nanoscale light confinement without metal. *Optica,* 1(2):96-100, 2014.

[22] Saman Jahani and Zubin Jacob. All-dielectric metamaterials. *Nature nanolechnology,* 11(1):23, 2016.

[23] Saman Jahani, Sangsik Kim, Jonathan Atkinson, Justin C Wirth, Farid Kalhor, Abdullah Al Noman, Ward D Newman, Prashant Shekhar, Kyunghun Han, Vien Van, et al. Controlling evanescent waves using silicon photonic all-dielectric metamaterials for dense integration. *Nature communications,* 9(1):1-9, 2018.

[24] T J Kippenberg, S M Spillane, and K J Vahala. Kerr-nonlinearity optical parametric oscillation in an ultrahigh-q torpid microcavity. *Physical review letters,* 93(8):083904, 2004.

[25] Kirill Koshelev, Sergey Kruk, Elizaveta Melik-Gaykazyan, Jae-Hyuck Choi, Andrey Bogdanov, Hong-Ciyu Park, and Yuri Kivshar. Subwavelength dielectric resonators for nonlinear nanophotonics. *Science,* 367(6475):288-292, 2020.

[26] Alexander Krasnok, Mykhailo Tymchenko, and Andrea Ala. Nonlinear metasurfaces: a paradigm shift in nonlinear optics. *Materials Today,* 21(1):8-21, 2018.

[27] Arseniy I Kuznetsov, Andrey E Miroshnichenko, Mark L Brongerstna, Yuri S Kivshar, and Boris Lukâ€™yanchuk. Optically resonant dielectric nanostructures. *Science,* 354(6314): aag2472, 2016.

[28] Philippe Lalanne, Wei Yan, Kevin Vynck, Christophe Sauvan, and Jean-Paul Hugonin. Light interaction with photonic and plasmonic resonances. *Laser & Photonics Reviews,* 12(5):1700113, 2018.

[29] Zin Lin, Xiangdong Lung. Marko Loricar, Steven G Johnson, and Alejandro W Rodriguez. Cavity-enhanced second-harmonic generation via nonlinear-overlap optimization. *Optica,* 3(3):233-238, 2016.

[30] Sheng Liu, Michael B Sinclair, Sina Saravi, Gordon A Keeler, Yuanmu Yang, John Reno, Gregory M Peake, Frank Setzpfandt, Isabelle Staude, Thomas Pertsch, et al. Resonantly enhanced second-harmonic generation using iii-v semiconductor all-dielectric metasurfaces. *Nano letters,* 16(9):5426-5432, 2016.

[31] Daniil M Lukin, Constantin Dory, Melissa A Guidry, Ki Youl Yang, Sattwik Deb Mishra, Rahul Trivedi, Marina Radulaski, Shuo Sun, Dries Vercruysse, Geun Ho Ahn, et al. 4h-silicon-carbide-on-insulator for integrated quantum and nonlinear photonics. *Nature Photonics,* 14(5):330-334, 2020.

[32] Alireza. Marandi, Nick C Leindecker, Vladimir Pervak, Robert L Byer, and Konstantin L Vodopyanov. Coherence properties of a broadband femtosecond mid-ir optical parametric oscillator operating at degenaracy. *Optics express,* 20(7):7255-7262, 2012

[33] Alireza Marandi, Zhe Wang, Kenta Takata, Robert L Byer, and Yoshihisa Yamamoto. Network of time-multiplexed optical parametric oscillators as a coherent icing machine. *Nature Photonics,* 8(12):937, 2014.

[34] Giuseppe Marino, Alexander S Solntsev, Lei Xu, Valerio F Gili, Luca Carletti, Alexander N Poddubny, Mohsen Rahmani, Dacia A Smirnova, Haitao Chen, Aristide Lema13053'ftre, et al. Spontaneous photon-pair generation from a dielectric nanoantenna. *Optica,* 6(11):1416-1422, 2019.

[35] Peter L McMahon, Alireza Marandi, Yoshitaka Haribara, Ryan Hamerly, Carsten Langrock, Shuhei Tannate, Takahiro Inagaki, Hiroki Takesue, Shoko Utsunomiya; Kazuyuki Aihara, et al. A fully programmable 100-spin coherent king machine with all-to-all connections. *Science*, 354(6312):614-617, 2016.

[36] G Milburn and D F Walls. Production of squeezed states in a degenerate parametric amplifier. *Optics Communications*, 39(6):401-404, 1981.

[37] Momchil Minkov, Dario Gerace, and Shanhui Fan. Doubly resonant χ(2) nonlinear photonic crystal cavity based on a bound state in the continuum. *Optica*, 6(8): 1039-1045, 2019.

[38] Mohammad-Ali Miri and Andrea Alta. Exceptional points in optics and photonics. *Science*, 363(6422), 2019.

[39] Sean Molesky, Zin Lin, Alexander Y Piggott, Weiliang Jin, Jelena Vucković, and Alejandro W Rodriguez. Inverse design in nanophotonics. *Nature Photonics*, 12(11):659-670, 2018.

[40] Francesco Monticone and Andrea Alu. Embedded photonic eigenvalues in 3d nanostructures. *Physical Review Letters*, 112(21):213903, 2014.

[41] Olivier Morin, Kun Huang, Jianli Liu, Hanna Le Jeannie, Claude Fabre, and Julien Laurat. Remote creation of hybrid entanglement between particle-like and wave-like optical qubits. *Nature Photonics*, 8(7):570, 2014.

[42] E A Muljarov and Wolfgang Langbein. Exact mode volume and purcell factor of open optical systems. *Physical Review B.* 94(23):235438, 2016.

[43] A V Muraviev, V O Smolski, Z E Loparo, and K L Vodopyanov. Massively parallel sensing of trace molecules and their isotopologues with broadband subharmonic mid-infrared frequency combs. *Nature Photonics*, 12(4):209-214, 2018.

[44] Rajveer Nehra, Aye Win, Milner Eaton, Reihaneh Shahrokhshahi, Niranjan Sridhar, Thomas Gerrits, Adriana Eta, Sae Woo Nam, and Olivier Pfister. State-independent quantum state tomography by photon-number-resolving measurements. *Optica*, 6(10):1356-1360, 2019.

[45] Michael P Nielsen, Xingyuan Shi, Paul Dichtl, Stefan A Maier, and Rupert F Oulton. Giant nonlinear response at a plasmonic nanofocus drives efficient four-wave mixing. *Science*, 358(6367):1179-1181, 2017.

[46] Yoshitomo Okawachi, Mengjie Yu, Kevin Luke, Daniel O Carvalho, Sven Ramelow, Alessandro Farsi, Michal Lipson, and Alexander L Gaeta Dual-pumped degenerate kerr oscillator in a silicon nitride microresonator. *Optics letters;* 40 (22):5267-5270, 2015.

[47] Thomas Pertsch and Yuri Kivshar. Nonlinear optics with resonant metasurfaces. *MRS Bulletin*, 45(3):210-220, 2020.

[48] Alexander N Poddubny and Dania A Smirnova. Nonlinear generation of quantum-entangled photons from high-q states in dielectric nanoparticles. arXiv: 1808.04811, 2018.

[49] Aaswath Raman and Shanhui Fan. Photonic band structure of dispersive metamaterials formulated as a hermitian eigenvalue problem. *Physical review letters*, 104(8):087401, 2010.

[50] Orad Reshef, Israel De Leon, M Zahirul Alam, and Robert W Boyd. Nonlinear optical effects in epsilon-near-zero media. *Nature Reviews Materials*, 4(8):535-551, 2019.

[51] Alejandro Rodriguez, Marin Soljačić, john D Joannopoulos, and Steven G Johnson. χ(2) and χ(3) harmonic generation at a critical power in inhomogeneous doubly resonant cavities. *Optics express*, 15(12):7303-7318, 2007.

[52] Jonathan Roslund, Renné Medeiros De Araujo, Shifeng Jiang, Claude Fabre. and Nicolas Treps. Wavelength-multiplexed quantum networks with ultrafast frequency combs. *Nature Photonics*, 8(2):109, 2014.

[53] Arkadev Roy, Saman Jahani, Qiushi Guo, Avik Dutt, Shanhui Fan, Mohammad-Ali Miri, and Alireza Marandi. Non-dissipative non-hermitian dynamics and exceptional points in coupled optical parametric oscillators. arXiv: 2009.07522, 2020.

[54] Arkadev Roy, Saman Jahani, Carsten Langrock, Martin Fejer, and Alireza Marandi. Spectral phase transitions in optical parametric oscillators. arXiv:2009.00930, 2020.

[55] Christophe Sauvan, Jean-Paul Hugonin, I S Maksymov, and Philippe Lalanne. Theory of the spontaneous optical emission of nanosize photonic and plasmon resonators. *Physical Review Letters*, 110(23):237401, 2013.

[56] Albert Schliesser, Nathalie Picqué, and Theodor W Hänsch. Mid-infrared frequency combs. *Nature Photonics*, 6(7):440, 2012.

[57] Darla Smirnova and Yuri S Kivshar. Multipolar nonlinear nanophotonics. *Optica*, 3(11):1241-1255, 2016.

[58] Maria Timofeeva, Lukas Lang, Flavia Timpu, Claude Renaut, Alexei Bouravleuv, Igor Shtrom, George Orlin, and Rachel Grange, Anapoles in free-standing iii-v nanodisks enhancing second-harmonic generation. *Nano letters*, 18(6):3695-3702, 2018.

[59] Cheng Wang, Carsten Langrock, Alireza Marandi, Marc Jankowski, Mian Zhang, Boris Desiatov, Martin M Fejer, and Marko Lonear, Ultrahigh-efficiency wavelength conversion in nanophotonic periodically poled lithium niobate waveguides. *Optica*, 5(11):1438-1441, 2018.

[60] Christoph Sebastian Werner, Tobias Beckmann, Karsten Buse, and Ingo Breunig. Blue-pumped whispering gallery optical parametric oscillator. *Optics letters*, 37(20):4224-4226, 2012.

[61] Ling-An Wu, H J Kimble, J L Hall, and Huifa Wu. Generation of squeezed states by parametric down conversion. *Physical review letters*, 57(20):2520, 1986.

[62] Li Ping Yang and Zubin Jacob. Single-photon pulse induced giant response in n>100 qubit system. *npj Quantum Information*, 6(1):1-6, 2020.

[63] Yuanmu Yang, Jian Lu, Alejandro Manjavacas, Ting S Luk, Hanzhe Liu, Kyle Kelley, Jon-Paul Maria, Evan L Runnerstrom, Michael B Sinclair, Shambhu Ghimire, et al. High-harmonic generation from an epsilon-near-zero material, *Nature Physics*, 15(10):1022-1026, 2019.

[64] Wei Yan, Rémi Faggiani, and Philippe Lalanne. Rigorous modal analysis of plasmonic nanoresonators, *Physical Review B*, 97(20):205422, 2018.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
one or more optical parametric oscillators (OPOs), each of the OPOs comprising:
a resonator comprising a material having a nonlinear susceptibility generating an output electromagnetic field in response to a pump electromagnetic field inputted into the material, wherein:

the output electromagnetic field has one or more output wavelengths longer than one or more pump wavelengths of the pump electromagnetic field, and the resonator has dimensions wherein a largest of the dimensions is:

less than 10 microns, and within a factor of 2 of the one or more output wavelengths in free space.

2. The device of claim 1, wherein the resonator comprises a particle having the dimensions.

3. The device of claim 1, wherein the resonator fits within a sphere or spherical volume having a radius of 5 microns.

4. The device of claim 1, wherein the resonator supports one or more quasi normal electromagnetic modes of at least one of the pump electromagnetic field or the output electromagnetic field.

5. The device of claim 4, wherein the quasi normal electromagnetic modes comprise one or more multi polar Mie resonances comprising the output electromagnetic field.

6. The device of claim 4, further comprising a disk comprising the resonator, a cylinder comprising the resonator, or a sphere comprising the resonator.

7. The device of claim 1, wherein the material comprises at least one of a metal, a dielectric, a semiconductor, or a polymer.

8. The device of claim 1, wherein the resonator supports one or more plasmonic modes of at least one of the pump electromagnetic field or the output electromagnetic field.

9. The device of claim 8, comprising a plurality of the OPOs wherein the resonators are evanescently coupled or coupled through waveguides or auxiliary cavities.

10. The device of claim 8, comprising a plurality of the OPOs outputting a plurality of output electromagnetic fields in response to a plurality of the pump electromagnetic fields, each of the pump electromagnetic fields can have at least one of a phase or an amplitude that is different from the phase or the amplitude of another of the pump electromagnetic fields.

11. The device of claim 1, wherein the resonator comprises a structure including a gap that supports a plasmonic mode that overlaps with the material.

12. The device of claim 11, further comprising an additional material having a second order nonlinear susceptibility on top of the gap.

13. The device of claim 1, wherein the resonator includes an additional material having a different dielectric constant than the material, so as to increase an efficiency of a parametric interaction of the pump electromagnetic field and the output electromagnetic field as compared to without the additional material.

14. The device of claim 13, wherein:

the resonator includes a plurality of regions or pixels including different dielectric constants and thicknesses arranged to tailor an overlap of the pump electromagnetic field and the output electromagnetic field, and the additional material comprises at least one of a polymer, a glass, a linear material, or an index of refraction less than 2.

15. A photonic integrated circuit including one or more of the resonators of claim 1.

16. The photonic integrated circuit of claim 15, further comprising a source of the pump electromagnetic field at a location off the photonic integrated circuit and having a free space coupling to the resonator, wherein the photonic integrated circuit does not include a fiber coupling or waveguide coupling the pump electromagnetic field applied from the free space.

17. A sensor, comprising:

a network including a plurality of the OPOs of claim 1; and one or more detectors coupled to detect the output electromagnetic field, thereby sensing at least one of the pump electromagnetic field or an environment around the network via a detection of the output electromagnetic field by the detector.

18. An optical computer, comprising:

a network including a plurality of the OPOs of claim 1; and couplings between the OPOs, wherein the couplings are adjusted to model an array of coupled spins, so that a minimum threshold of each of the OPOs corresponds to a minimum energy configuration of one of the coupled spins in the array.

19. The device of claim 1, wherein the largest of the dimensions comprises at least one of a dimeter, a width, a length, or a height.

20. A method of operating an optical parametric oscillator (OPO), comprising:

inputting a pump electromagnetic field into a resonator comprising a material having a nonlinear susceptibility generating an output electromagnetic field in response to the pump electromagnetic field, wherein:

the output electromagnetic field has one or more output wavelengths longer than one or more pump wavelengths of the pump electromagnetic field, and the resonator has dimensions wherein a largest of the dimensions is less than 10 microns and within a factor of 2 of the one or more output wavelengths in free space, and wherein the OPO is configured for at least one of the following:

the OPO operating at degeneracy such that at least one of the output wavelengths is twice at least one of the pump wavelengths, the output electromagnetic field comprises a frequency comb comprising a set of equidistant frequency peaks, the output electromagnetic field has an output spectrum broader than an input spectrum of the pump electromagnetic field, in frequency units measured at the 30-dB level below the peak, or the pump electromagnetic field comprising a continuous wave, a time-varying, or a pulsed electromagnetic field.

21. A method of making an optical parametric oscillator, comprising:

providing a resonator comprising a material having a nonlinear susceptibility generating an output electromagnetic field in response to a pump electromagnetic field inputted into the material, wherein:

the output electromagnetic field has one or more output wavelengths longer than one or more pump wavelengths of the pump electromagnetic field, and the resonator has dimensions, wherein a largest of the dimensions is less than 10 microns and within a factor of 2 of the one or more output wavelengths in free space.

* * * * *